US012334095B2

(12) United States Patent
Bryan et al.

(10) Patent No.: US 12,334,095 B2
(45) Date of Patent: Jun. 17, 2025

(54) META-LEARNING FOR ADAPTIVE FILTERS

(71) Applicant: Adobe Inc., San Jose, CA (US)

(72) Inventors: Nicholas J. Bryan, Belmont, CA (US); Paris Smaragdis, Urbana, IL (US)

(73) Assignee: Adobe Inc., San Jose, CA (US)

( * ) Notice: Subject to any disclaimer, the term of this patent is extended or adjusted under 35 U.S.C. 154(b) by 340 days.

(21) Appl. No.: 18/155,611

(22) Filed: Jan. 17, 2023

(65) Prior Publication Data

US 2023/0343350 A1 Oct. 26, 2023

Related U.S. Application Data

(60) Provisional application No. 63/332,992, filed on Apr. 20, 2022.

(51) Int. Cl.

| | |
|---|---|
| ***G10L 21/0232*** | (2013.01) |
| ***G10L 25/18*** | (2013.01) |
| ***G10L 25/30*** | (2013.01) |
| *G10L 21/0208* | (2013.01) |
| *G10L 21/0224* | (2013.01) |

(52) U.S. Cl.

CPC .......... *G10L 21/0232* (2013.01); *G10L 25/18* (2013.01); *G10L 25/30* (2013.01); *G10L 2021/02082* (2013.01); *G10L 21/0224* (2013.01)

(58) Field of Classification Search

CPC ............................ G10L 21/0232; G10L 25/30

See application file for complete search history.

(56) References Cited

U.S. PATENT DOCUMENTS

| | | | | |
|---|---|---|---|---|
| 2016/0377714 | A1* | 12/2016 | Masuda | G01S 13/56 342/28 |
| 2020/0312345 | A1* | 10/2020 | Fazeli | H04M 9/082 |
| 2022/0343891 | A1* | 10/2022 | Kodatsu | G10K 11/17883 |

OTHER PUBLICATIONS

Andrychowicz, M. et al., "Learning to learn by gradient descent by gradient descent," NIPS'16: Proceedings of the 30th International Conference on Neural Information Processing Systems, Dec. 2016, pp. 3988-3996.

(Continued)

*Primary Examiner* — Bryan S Blankenagel

(74) *Attorney, Agent, or Firm* — Nicholson De Vos Webster & Elliott LLP

(57) ABSTRACT

Embodiments are disclosed for performing a using a neural network to optimize filter weights of an adaptive filter. In particular, in one or more embodiments, the disclosed systems and methods comprise receiving, by a filter, an input audio signal, wherein the input audio signal is a far-end audio signal, the filter including a transfer function with adaptable filter weights, generating a response audio signal modeling the input audio signal passing through the acoustic environment, receiving a target response signal, including the input audio signal and near-end audio signals, calculating an adaptive filter loss, generating, by a trained recurrent neural network, a filter weight update using the calculated adaptive filter loss, updating the adaptable filter weights of the transfer function to create an updated transfer function, generating an updated response audio signal based on the updated transfer function, and providing the updated response audio signal as an output audio signal.

20 Claims, 12 Drawing Sheets

(56) References Cited

OTHER PUBLICATIONS

Haubner, T. et al., "End-To-End Deep Learning-Based Adaptation Control for Frequency-Domain Adaptive System Identification," ICASSP 2022—2022 IEEE International Conference on Acoustics, Speech and Signal Processing (ICASSP), May 2022, pp. 766-770.
Mahmood, A.R. et al., "Tuning-free step-size adaptation," 2012 IEEE International Conference on Acoustics, Speech and Signal Processing (ICASSP), Mar. 2012, pp. 2121-2124.
Soo, J.S. et al., "Multidelay block frequency domain adaptive filter," IEEE Transactions on Acoustics, Speech, and Signal Processing, vol. 38, No. 2, Feb. 1990, pp. 373-376.
Sutton, R.S., "Adapting Bias by Gradient Descent: An Incremental Version of Delta-Bar-Delta," Proceedings of the Tenth National Conf. on Artificial Intelligence, Jul. 1992, pp. 171-176.
Zhang, H. et al., "Deep Adaptive Aec: Hybrid of Deep Learning and Adaptive Acoustic Echo Cancellation," ICASSP 2022—2022 IEEE International Conference on Acoustics, Speech and Signal Processing (ICASSP), May 2022, pp. 756-760.

* cited by examiner

600 function FORWARD$(g_\phi, \psi, h_\theta, \underline{\mathbf{u}}, \underline{\mathbf{d}})$ for $\tau \leftarrow 0$ to $L$ do ▷ Unroll $\mathbf{u}[\tau], \mathbf{d}[\tau] \leftarrow \text{STFT}(\underline{\mathbf{u}}[\tau], \underline{\mathbf{d}}[\tau])$ ▷ Forward STFT $\mathbf{y}[\tau] \leftarrow h_\theta(\mathbf{u}[\tau])$ ▷ Save filter output $\underline{\mathbf{y}}[\tau] \leftarrow \text{STFT}^{-1}(\mathbf{y}[\tau])$ ▷ Inverse STFT $\mathcal{L} \leftarrow |\mathbf{d}_\mathrm{m}[\tau] - \mathbf{y}_\mathrm{m}[\tau]|^2$ ▷ AF frame loss $\nabla[\tau] \leftarrow \text{GRAD}(\mathcal{L}, \theta)$ ▷ Filter gradient for $\mathrm{k} \leftarrow 0$ to $K$ do ▷ Apply update per freq $\xi_\mathrm{k}[\tau] \leftarrow \{\nabla_\mathrm{k}[\tau], \mathbf{u}_\mathrm{k}[\tau], \mathbf{d}_\mathrm{k}[\tau], \mathbf{y}_\mathrm{k}[\tau]\}$ $(\Delta_\mathrm{k}[\tau], \psi_\mathrm{k}[\tau+1]) \leftarrow g_\phi(\xi_\mathrm{k}[\tau], \psi_\mathrm{k}[\tau])$ $\theta_\mathrm{k}[\tau+1] \leftarrow \theta_\mathrm{k}[\tau] + \Delta_\mathrm{k}[\tau]$ $\bar{\mathbf{y}} \leftarrow \text{VEC}(\underline{\mathbf{y}})$ ▷ Concatenate return $\bar{\mathbf{y}}, \psi, h_\theta$ function TRAIN$(\mathcal{D})$ $\phi, \psi \leftarrow$ [79] init $\theta \leftarrow 0$ for $\infty$ do ▷ Train loop $\underline{\mathbf{u}}, \underline{\mathbf{d}} \leftarrow \text{SAMPLE}(\mathcal{D})$ ▷ Sample signals for $n \leftarrow 0$ to end do ▷ Loop across long signal $\bar{\mathbf{u}}, \bar{\mathbf{d}} \leftarrow \text{NEXTL}(\underline{\mathbf{u}}, \underline{\mathbf{d}})$ ▷ Get next $L$ frames $\bar{\mathbf{y}}, \psi, h_\theta \leftarrow \text{FORWARD}(g_\phi, \psi, h_\theta, \bar{\mathbf{u}}, \bar{\mathbf{d}})$ $\mathcal{L}_M \leftarrow \ln E[|\bar{\mathbf{d}} - \bar{\mathbf{y}}|^2]$ ▷ Meta loss $\nabla \leftarrow \text{GRAD}(\mathcal{L}_M, \phi)$ ▷ Optimizer gradient $\phi[n+1] \leftarrow \text{METAOPT}(\phi[n], \nabla)$ ▷ Update opt if CONVERGED then return $\hat{\phi}$ ▷ Done

FIG. 6

META-LEARNING FOR ADAPTIVE FILTERS

CROSS-REFERENCE TO RELATED APPLICATIONS

This application claims the benefit of U.S. Provisional Application No. 63/332,992, filed Apr. 20, 2022, which is hereby incorporated by reference.

BACKGROUND

Adaptive filtering algorithms are pervasive throughout signal processing and have a material impact on a wide variety of domains including audio processing, telecommunications, biomedical sensing, astrophysics and cosmology, seismology, and many more. Adaptive filters typically operate via specialized online, iterative optimization methods such as least-mean squares or recursive least squares and aim to process signals in unknown or nonstationary environments. Such algorithms, however, can be slow and laborious to develop, require domain expertise to create, and necessitate mathematical insight for improvement.

While some existing solutions attempt to address these issues, they have limitations and drawbacks, as they can be time-consuming and resource-intensive.

SUMMARY

Introduced here are techniques/technologies that utilize a recurrent neural network as an optimizer to generate filter weight updates for adaptable filter weights of a filter. The recurrent neural network learns adaptive filtering update rules directly from data (e.g., input audio signals).

In particular, in one or more embodiments, a meta-adaptive filter system receives an input including an input audio signal. Using a transfer function with adaptable filter weights, a filter of the meta-adaptive filter system generates a response audio signal. The response audio signal generated by the filter is an estimate/predicted response audio signal that attempts to model the input audio signal passing through an acoustic environment. The meta-adaptive filter system calculates an adaptive filter loss using the response audio signal and a target response signal, where the target response signal is the actual audio signal resulting from the input audio signal passing through the acoustic environment, including any added background noise and speech at the near-end and any echo of the input audio signal. The adaptive filter loss is provided to a learned adaptive filter optimizer of the meta-adaptive filter system, where the learned adaptive filter optimizer is a recurrent neural network. The recurrent neural network is trained to generate filter weight updates that can be applied to the filter to adapt the filter based on the incoming data (e.g., the input audio signal, the target response signal, etc.). After updating the filter using the filter weight updates, the filter generates an updated response audio signal that can be provided as an output audio signal.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIG. 6 is an example training algorithm used to train a learned adaptive filter optimizer in accordance with one or more embodiments;

DETAILED DESCRIPTION

Figure 1:
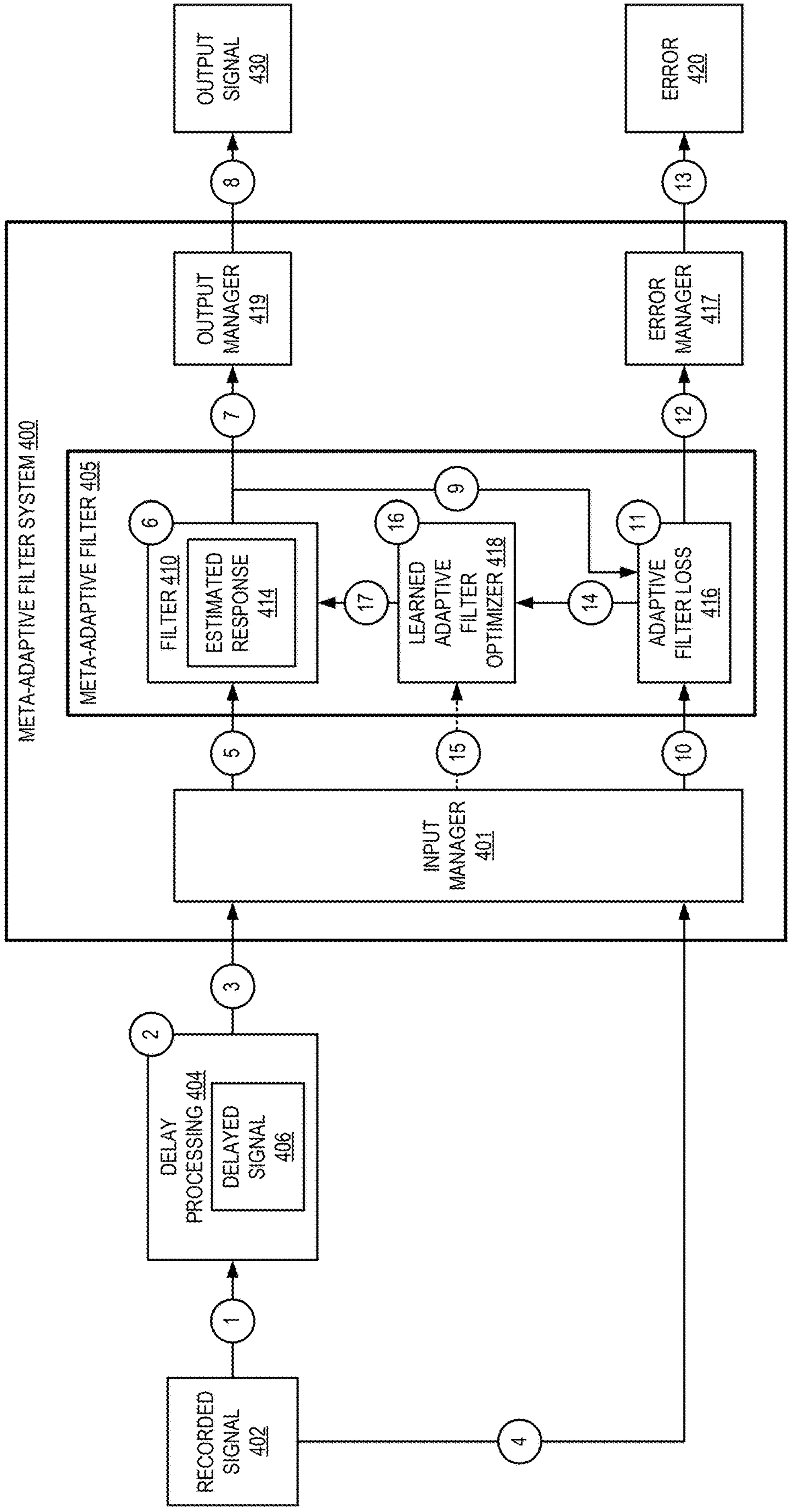
FIG. 1 illustrates a diagram of a trained meta-adaptive filter system used to perform acoustic echo cancellation in accordance with one or more embodiments.

One or more embodiments of the present disclosure include a meta-adaptive filter system that uses trained neural networks to generate filter weight updates for adaptable filter weights of a filter. Adaptive signal processing and adaptive filter theory are cornerstones of modern signal processing and have had a deep and significant impact on modern society. For example, multi-microphone consumer electronics devices such as smartphones, smart speakers, personal computers, and augmented/virtual reality devices commonly require high-quality, low-resource audio processing algorithms, or adaptive filters. Audio applications of adaptive filters are often categorized into one of four categories: system identification, inverse modeling, prediction, and interference cancellation. Each of these categories has numerous adaptive filter applications, so advances in one category or application can often be applied to many others. In the audio domain, acoustic echo cancellation can be formulated as single-channel or multi-channel system identification. Equalization can be formulated as an inverse modeling problem, has been explored in single-channel and multi-channel formats, and is used for sound zone reproduction and active noise control. Dereverberation can be formulated as a prediction problem. Finally, multi-microphone enhancement or beamforming can be formulated as an informed interference cancellation task.

Adaptive filters algorithms are typically laborious to develop, require manual derivations, and extensive tuning.

Existing learned optimizers are element-wise, offline, real-valued, only a function of the gradient, and are trained to optimize general purposes neural networks. Moreover, learned adaptive filter optimizers are deployed as the final output to solve one particular adaptive filter task at a time instead of using them to train downstream neural networks. Other existing systems use a supervised deep neural network to control the step-size of a Kalman filter for acoustic echo cancellation. In contrast, embodiments replace the entire update with a neural network, do not need supervisory signals, and apply techniques for a variety of tasks.

One or more embodiments include a meta-adaptive filter system configured to train a neural network as a learned adaptive filter optimizer with weights that can be used to iteratively optimize the filter weights of an adaptive filter. By learning online, adaptive filter algorithms, or update rules, directly from data via self-supervisions, the learned adaptive filter optimizer provides improvements in speed, as it does not need any supervised label data for learning and does not need exhaustive tuning. Embodiments also provide for improved adaptive filter performance, conference speed, and steady state performance. Further, by adapting based on data, embodiments are able to automatically learn extra logic, such as double-tale detection and also reconverge quickly responsive to any system changes (e.g., movement of speaker or microphone in a room, changes to the acoustic environment, etc.).

Embodiments described herein train neural networks as online learned adaptive filter optimizers that use one or more input signals, are complex-valued, adapt block frequency-domain linear filters or similar, and integrate domain-specific insights to reduce complexity and improve performance (coupling across channels and time frames). The algorithm used to train the neural network can be trained to model one of a plurality of tasks, including system identification, acoustic echo cancellation, equalization, single/multi-channel dereverberation, and beamforming, based on the type of training data provided to the neural network.

FIG. 1 illustrates a diagram of a trained meta-adaptive filter system 100 used to perform acoustic echo cancellation in accordance with one or more embodiments. Acoustic echo cancellation is typically used to cancel/remove acoustic feedback caused by playing far-end signals, such as echoes, reverberation, and other unwanted sounds at the near-end, having such signals pass through the near-end acoustic environment (e.g., acoustic environment 102), and then be recorded and sent back to the far-end. Such acoustic feedback can occur between a speaker and a microphone in loud-speaking audio systems, teleconferencing devices, hands-free mobile devices, and voice-controlled systems.

As illustrated in FIG. 1, a system input 104, u[τ], is fed to an input manager 101 of a meta-adaptive filter system 100, as shown at numeral 1. The system input 104 is a signal in the frequency-domain. In one or more embodiments, the input manager 101 is configured to receive signals (e.g., audio signals), including system input 104.

In one or more embodiments, while the system input 104 is sent to the input manager 101 of the meta-adaptive filter system 100, it is also passed through an acoustic environment 102 (e.g., an acoustic room), as shown at numeral 2. In addition, the acoustic environment 102 can also receive near-end speech 106, s[τ], and near-end noise 108, n[τ], as shown at numeral 3. For example, the system input 104 is a far-end audio signal received in the acoustic environment 102, the near-end speech 106 can include an audio signal (e.g., a user speaking) within the acoustic environment 102, and the near-end noise 108 can include background noises/sounds within the acoustic environment 102 (e.g., captured by a local microphone). In one or more embodiments, at least the system input 104, the near-end speech 106, and the near end-noise, are combined within the acoustic environment 102 to generate target response 112, d[τ], at numeral 4. The target response 112 is an audio signal generated based on the acoustic environment 102. The target response is then sent to the input manager 101, as shown at numeral 5. Although FIG. 1 depicts a single input manager 101, in one or more embodiments, the input manager that receives the target response 112 can be a different input manager than the input manager that receives the system input 104.

In one or more embodiments, the input manager 101 that received the system input 104 is configured to receive inputs (e.g., audio signals) and pass them to a meta-adaptive filter 105, as shown at numeral 6. In one or more embodiments, the meta-adaptive filter 105 includes a filter 110 that includes weights that are adapted, an adaptive filter loss 116, and a learned adaptive filter optimizer 118 that is trained to determine an update rule that is used to adapt the weights of the filter 110 to minimize loss using the adaptive filter loss 116.

In one or more embodiments, the filter 110 is a short-time Fourier transform (STFT) filter. STFT filters are filters in the frequency domain that include one or more delayed blocks. STFT filters can also be referred to as multi-delayed filters. In one or more other embodiments, the filter 110 can be a time-domain filter or a lattice filter. The filter 110 models the acoustic environment 102 with a linear frequency-domain filter, $h_\theta$, to generate an output that best matches the target response 112, at numeral 7. The output of the filter 110 is estimated response 114, y[τ]. The transfer function of the filter 110 can be expressed as:

$$h_{\theta[\tau]}(u[\tau])$$

where θ is a filter weight of the filter 110 and u[τ] is the system input 104.

The goal is to optimize the filter 110 of the meta-adaptive filter 105 such that the estimated response 114 closely resembles the target response 112 from the acoustic environment 102 with any echo of the system input 104 excluded. To do so, a learned adaptive filter optimizer 118, $g_\phi$, is defined as a neural network with one or more input signals parameters by weights, ϕ, that iteratively optimizes the adaptive filter loss 116. In one or more embodiments, a neural network includes deep learning architecture for learning representations of audio and/or video. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

In one or more embodiments, the filter 110 is an MDF filter with an optional parametric nonlinearity. MDF filters are commonly used for acoustic echo cancellation and leverage the benefits of both frequency-domain adaptation and low latency. In one or more embodiments, the filter 110 parameters θ include frequency domain filter coefficients. In some embodiments, the filter 110 parameters θ can further include a small set of nonlinear coefficients. The filter coefficients are partitioned into multiple delayed blocks and used within the framework of short-time Fourier transform (STFT) processing using either overlap-save (OLS) or overlap-add (OLA) style convolutions.

In one or more embodiments, the OLS filtering method uses block processing by splitting the input signal into overlapping windows and recombines complete non-overlapping components. Given frequency domain signal, $u_m[\tau] \in \mathbb{C}^K$, and frequency domain filter, $w_m[\tau] \in \mathbb{C}^K$, the frequency and time output for the $m^{th}$ channel, respectively can be expressed as:

$$y_m[\tau] = \mathrm{diag}(u_m[\tau]) Z_w w_m[\tau] \in \mathbb{C}^K$$

$$y_m[\tau] = Z_y y_m[\tau] \in \mathbb{R}^R$$

where $Z_w = F_K T_R^T T_R F_K^{-1} \in \mathbb{C}^{K \times K}$ and $Z_y = T_R F_K^{-1} \in \mathbb{C}^{R \times K}$ are anti-aliasing matrices, $T_R = [I_{K-R}, 0_{K-R \times R}] \in \mathbb{R}^{K-R \times K}$ trims the last R samples from a vector and $T_R = [0_{K-R \times R}, I_{K-R}] \in \mathbb{R}^{K-R \times K}$ trims the first R samples.

In one or more embodiments, the OLA filtering method computes the frequency and time output, and buffer update as:

$$y_m[\tau] = \mathrm{diag}(u_m[\tau]) w_m[\tau] \in \mathbb{C}^K$$

$$y_m[\tau] = T_R F_K^{-1} y_m[\tau] + \overline{T}_R b_m[\tau-1] \in \mathbb{R}^R$$

$$b_m[\tau] = F_K^{-1} y_m[\tau] + T_R^T \overline{T}_R b_m[\tau-1] \in \mathbb{R}^K$$

In one or more embodiments, the forward and inverse DFTs are combined with analysis and synthesis windows (e.g., Hann windows) and optionally zero-padded. For multi-frame frequency-domain filters, the (anti-aliased) filter is $w_m[\tau] \in \mathbb{C}^{K \times BM}$ with B buffered frequency frames, the input is $\tilde{u}[\tau] \in \mathbb{C}^{K \times BM}$ and the output is $y_m[\tau] = (\tilde{u}[\tau] \odot w_m[\tau]) 1_{BM \times 1}$.

In one or more embodiments, the MDF filter includes frequency domain filter coefficients, $W \in \mathbb{C}^{M \times N}$, where M is the number of delayed blocks, N is the fast Fourier transform (FFT) size, $$P = M \cdot \frac{N}{2}$$

is the number of filter parameters, and L is the filter length in samples. The filter matrix is applied to the delayed frequency domain near-end inputs, $U \in \mathbb{C}^{M \times N}$, to yield a filtered output via $$y_n = \text{last } \frac{N}{2} \text{ terms of } \{FFT^{-1}((W \odot U)^T 1_N)\},$$

where T is a matrix transpose, $\odot$ is the Hadamard product, and $1_N$ is an N×1 matrix of ones. To construct U, the time-domain near-end signal is buffered to length N with time overlap R, forming $u_{\bar{n}} \in \mathbb{R}^N$, shift $U_m = U_{m+1}$, for m=1 to M−1, and assign $U_m = \mathrm{FTT}(u_{\bar{n}})$. Finally, W is anti-aliased after each update so that each block has $$\frac{N}{2}$$

nonzero time-domain parameters. In one or more embodiments, for nonlinearity extension, each element $u_n$ of the far-end reference signal can be preprocessed through a parametric sigmoid as follows:

$$\gamma(u_n) = \alpha_4 \left( \frac{2}{1 + \exp(\alpha_2 \hat{u}_n + \alpha_3 \hat{u}_n^2)} - 1 \right)$$

where $$\hat{u}_n = (u_n \cdot \alpha_1) \Big/ \left( \sqrt{|u_n|^2 + |\alpha_1|^2} \right)$$

and $\alpha_i \forall i$ are adapted. In some embodiments, a general non-linear function, such as a small neural network, can be used.

After generating the estimated response 114, the filter 110 can send the estimated response 114 to an output manager 119, as shown at numeral 8. The estimated response 114 can then be sent as output signal 130, as shown at numeral 9.

The output of the filter 110 is also sent to an adaptive filter loss 116, as shown at numeral 10. The input manager 101 sends the target response 112 to the adaptive filter loss 116, as shown at numeral 11. The adaptive filter loss 116, or optimizee loss, can be calculated using the target response 112 and the estimated response 114, at numeral 12. In one or more embodiments, the adaptive filter loss 116 is the mean squared error (MSE) between the target response 112, $d[\tau]$, and the estimated response 114, $h_{\theta[\tau]}(u[\tau])$. The adaptive filter loss 116 can be represented as:

$$\mathcal{L}(d[\tau], h_{\theta[\tau]}(u[\tau]))$$

The adaptive filter loss 116 can also generate an error 120 (e.g., an error signal, $e[\tau]$) that is sent to an error manager 117, as shown at numeral 13. The error manager 117 can output the error 120, as shown at numeral 14.

The adaptive filter loss 116 can then be provided to the learned adaptive filter optimizer 118, $g_\phi$, to determine an update to the weights of the filter 110, as shown at numeral 15. In one or more embodiments, only the adaptive filter loss 116 generated in numeral 12 is sent to the learned adaptive filter optimizer 118.

In other embodiments, in addition to the adaptive filter loss 116, other signals are sent to the learned adaptive filter optimizer 118. In some embodiments, the system input 104 and the target response 112 are sent to the are sent to the learned adaptive filter optimizer 118 by the input manager 101, as shown at numeral 16. In one or more embodiments, the system input 104 can be sent to the adaptive filter loss 116 (e.g., via the filter 110) and then passed to the learned adaptive filter optimizer 118 (e.g., as part of numeral 15). Similarly, in one or more embodiments, the target response 112 can be passed to the learned adaptive filter optimizer 118 (e.g., as part of numeral 15). In addition, the estimated response 114 and error 120 can be sent with the adaptive filter loss 116 at numeral 15. In such embodiments, by sending the additional input signals to the learned adaptive filter optimizer 118, the meta-adaptive filter 105 can leverage additional information and automatically fuse such signals together to achieve a more powerful learned adaptive filter optimizer 118.

The learned adaptive filter optimizer 118 is a neural network trained to generate an adaptive filter weight update for the filter 110. In one or more embodiments, the learned adaptive filter optimizer 118 is an online optimizer trained to optimize the filter 110 (e.g., the optimizee) by determining the filter weight update, at numeral 17. The learned adaptive filter optimizer 118, $g_\phi(\cdot)$, includes one or more input signals parameterized by weights $\phi$ that iteratively optimizes the adaptive filter loss 116, $\mathcal{L}(\cdot, h_\theta(\cdot))$.

Given dataset $\mathcal{D}$, an optimal adaptive filter optimizer, $g_{\hat{\phi}}$, can be determined by:

$$g_{\hat{\phi}} = \arg\min_{g_\phi} E_{\mathcal{D}}[\mathcal{L}_M(g_\phi, \mathcal{L}(\cdot, h_\theta))]$$

where $\mathcal{L}_M(g_\phi, \mathcal{L}(\cdot, h_\theta))$ is the meta adaptive filter loss that is a function of the learned adaptive filter optimizer 118, $g_\phi$, the filter architecture, $h_\theta$, and adaptive filter loss 116, $\mathcal{L}$.

The weight, $\theta$, of the filter 110 can then be updated via an additive update rule of the form:

$$\theta[\tau+1]=\theta[\tau]+g_\phi(\cdot)$$

where $\theta[\tau]$ are the filter parameters at time $\tau$ and $g_\phi(\cdot)$ is the update received from the learned adaptive filter optimizer 118.

In one or more embodiments, the learned adaptive filter optimizer 118 is a generalized, stochastic variant of a RLS-like optimizer that is applied independently per frequency k to the optimizee parameters but coupled across channels and time frames to model interactions between channels and frames and vectorize across frequency. A gated recurrent neural network (RNN) is used where the weights, $\phi$, are shared across all frequency bins, but separate states, $\psi_k[\tau]$, are maintained per frequency. In embodiments where the learned adaptive filter optimizer 118 receives additional input signals, the input to the learned adaptive filter optimizer 118 is a vector of gradients plus other inputs (e.g., input signal u, etc.) and the output of the learned adaptive filter optimizer 118 is a vector of gradients plus other inputs (e.g., input signal u, etc.). In one or more embodiments, the inputs to the learned adaptive filter optimizer 118 at frequency k can be expressed as:

$$\xi=[\tau]=\{\nabla_k[\tau],u_k[\tau],d_k[\tau],y_k[\tau]\}$$

where $\nabla_k[\tau]$ is the gradient of optimizee (e.g., the filter 110) with respect to $\theta_k$. The outputs of the learned adaptive filter optimizer 118 are the update to the gradient, $\Delta_k[\tau]$, and the updated internal state, $\psi_k[\tau+1]$, resulting in:

$$(\Delta_k[\tau],\psi_k[\tau+1])=g_\phi(\xi_k[\tau],\psi_k[\tau])$$

$$\theta_k[\tau+1]=\theta_k+\Delta_k[\tau]$$

In one or more embodiments, the input to the learned adaptive filter optimizer 118 is a single gradient (e.g., for an independent point in time) and the output of the learned adaptive filter optimizer 118 is a single updated gradient. However, in other embodiments, the input to the learned adaptive filter optimizer 118 is a vector of gradients (e.g., for a buffer period of time) and the output of the learned adaptive filter optimizer 118 is a vector of updated gradients. Unlike most neural network, which only consider real-valued numbers and arithmetic, the learned adaptive filter optimizer 118 can be implemented as a gated RNN with complex arithmetic using JAX as a neural network framework. For example, the inputs and outputs of the learned adaptive filter optimizer 118 can be complex numbers (e.g., a+jb, where $j=\sqrt{-1}$). In one or more embodiments, the weights of learned adaptive filter optimizer 118 are also complex-valued. In one or more embodiments, other neural network frameworks (e.g., PyTorch, TensorFlow, etc.) can be used.

In one or more embodiments, the RNN is defined by a small network composed of a linear layer, nonlinearity, and two Gated Recurrent Unit (GRU) layers is used, followed by two additional linear layers with nonlinearities, where all layers are complex-valued. Prior to the input, the error 120, $e_k[\tau]$, is computed, where $e_k[\tau]=d_k[\tau]-y_k[\tau]$, all input signals, $\xi_k[\tau]$, are stacked with $e_k[\tau]$ into a single vector, and the input vector magnitudes are approximately whitened element-wise via $\ln(1+|\nabla|)e^{j\angle\nabla}$ to reduce the dynamic range and facilitate training but keep the phases unchanged.

In one or more embodiments, two meta losses, $\mathcal{L}_M(\cdot)$, are examined to learn optimizer parameters, $\phi$. First, a frequency-domain frame independent loss is defined as:

$$\mathcal{L}_M = \ln\frac{1}{L}\sum_{\tau}^{\tau+L} E\left[\|d[\tau]-y[\tau]\|^2\right]$$

where d [τ] and y[τ] are the desired and estimated frequency-domain signal vectors. To compute this loss for a given optimizer, $g_\phi$, $\theta[\tau+1]=\theta[\tau]+g_\phi(\cdot)$ is run for a time horizon of L time frames (e.g., an unroll length), compute the average frequency-domain mean-squared error over L frames, and then take the logarithm to reduce the dynamic range. In one or more embodiments, this loss ignores the temporal order of adaptive filter updates and optimizes for filter coefficients that are unaware of any downstream STFT processing.

Then, a time-domain frame accumulated loss is defined as:

$$\mathcal{L}_M=\ln E[|\overline{d}[\tau]-\overline{y}[\tau]|^2]$$

$$\overline{d}[\tau]=vec(\underline{d}[\tau],\underline{d}[\tau+1], \ldots \underline{d}[\tau+L])\in R^{RL\times M}$$

$$\overline{y}[\tau]=vec(\underline{y}[\tau],\underline{y}[\tau+1], \ldots \underline{y}[\tau+L])\in R^{RL\times M}$$

where $\overline{d}[\tau]$ and $\overline{y}[\tau]$ are the time-domain desired and estimated responses. To compute this loss for a given optimizer, $g_\phi\theta[\tau+1]=\theta[\tau]+g_\phi(\cdot)$ is run for a time horizon of L time frames (e.g., an unroll length), concatenate the sequence of time-domain outputs and target signals to form longer signals, then compute the time-domain MSE loss, and take the logarithm. While both the frequency-domain frame independent loss and the time-domain frame accumulated loss use the same time-horizon, the frame accumulated loss models boundaries between adjacent updates and implicitly learns update that are short-time Fourier filtering (STFT) consistent.

The output of the learned adaptive filter optimizer 118 is sent to the filter 110, as shown at numeral 18. The filter weights, $\theta$, of the filter 110 are then updated using the output of the learned adaptive filter optimizer 118 to better model the acoustic environment 102. Using the updated filter weights, the filter 110 can generate an updated estimated response 114, as described above with respect to numeral 7. The updated estimated response 114 is an audio signal where the far-end signal (e.g., the input signal) has been canceled out, such that any echo of the far-end signal captured at the near-end (e.g., the microphone) is not received back at a far-end receiver. The updated estimated response 114 can then be sent as an output as described above with respect to numerals 8 and 9.

Figure 2:
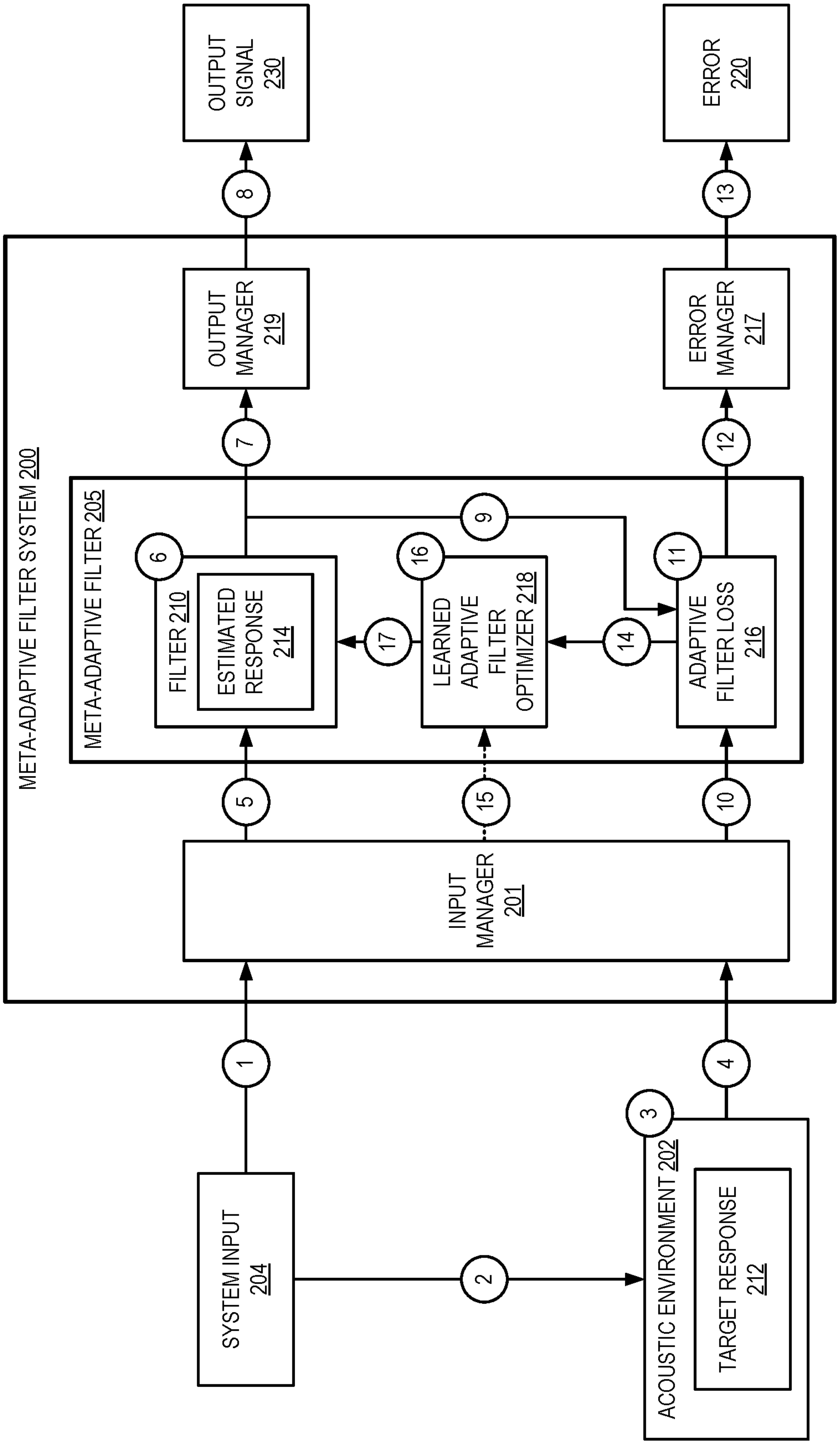
FIG. 2 illustrates a diagram of a trained meta-adaptive filter system used to perform system identification in accordance with one or more embodiments.

FIG. 2 illustrates a diagram of a trained meta-adaptive filter system 200 used to perform system identification in accordance with one or more embodiments. System identification is typically used to estimate the transfer function between an audio source and a microphone to determine the dynamic acoustic environment (e.g., acoustic environment 202) an audio signal is passing through. System identification is a task commonly used for room acoustics and transfer function measurements for virtual and augmented reality. System identification can also be used to determine head-related transfer functions used to model the frequency domain of impulse responses from sound sources around a listener's head to the listener's ears and used for 3D audio simulation.

As illustrated in FIG. 2, a system input 204, u[τ], is fed to an input manager 201 of a meta-adaptive filter system 200, as shown at numeral 1. The system input 204 is a signal in the frequency-domain.

In one or more embodiments, while the system input 204 is sent to the input manager 201 of the meta-adaptive filter system 200, it is also passed through an acoustic environment 202 (e.g., an acoustic room), as shown at numeral 2. For example, system input 204 can be an audio signal from a speaker in a room that is picked up by a microphone in the room, where the acoustic environment 202 is the space between the speaker and the microphone that the system input 204 propagates through. The target response 212, d[τ], is an audio signal generated based on the acoustic environment 202 (e.g., the audio signal received by the microphone after propagating through the acoustic environment 202), at numeral 3. The target response is then sent to an input manager 201, as shown at numeral 4. Although FIG. 2 depicts a single input manager 201, in one or more embodiments, the input manager that receives the target response 212 can be a different input manager than the input manager that receives the system input 204.

In one or more embodiments, the input manager 201 that received the system input 204 is configured to receive inputs (e.g., audio signals) and pass them to a meta-adaptive filter 205, as shown at numeral 5. In one or more embodiments, the meta-adaptive filter 205 includes a filter 210 that includes weights that are adapted, an adaptive filter loss 216, and a learned adaptive filter optimizer 218 that is trained to determine an update rule that is used to adapt the weights of the filter 210 to minimize loss using the adaptive filter loss 216.

In one or more embodiments, the filter 210 is a short-time Fourier transform (STFT) filter. STFT filters are filters in the frequency domain that include one or more delayed blocks. STFT filters can also be referred to as multi-delayed filters. In one or more other embodiments, the filter 210 can be a time-domain filter or a lattice filter. The filter 210 models the acoustic environment 202 with a linear frequency-domain filter, $h_\theta$, to generate an output that best matches the target response 212, at numeral 6. The output of the filter 210 is estimated response 214, y[τ]. The transfer function of the filter 210 can be expressed as:

$$h_{\theta[\tau]}(u[\tau])$$

where θ is a filter weight of the filter 210 and u[τ] is the system input 204.

The goal is to optimize the filter 210 of the meta-adaptive filter 205 such that the estimated response 214 closely resembles the target response 212 from the acoustic environment 202. To do so, a learned adaptive filter optimizer 218, $g_\phi$, is defined as a neural network with one or more input signals parameters by weights, ϕ, that iteratively optimizes the adaptive filter loss 216.

In one or more embodiments, the filter 210 is an MDF filter with an optional parametric nonlinearity. MDF filters leverage the benefits of both frequency-domain adaptation and low latency. In one or more embodiments, the filter 210 parameters θ include frequency domain filter coefficients. In some embodiments, the filter 210 parameters θ can further include a small set of nonlinear coefficients. The filter coefficients are partitioned into multiple delayed blocks and used within the framework of short-time Fourier transform processing using either overlap-save (OLS) or overlap-add (OLA) style convolutions.

In one or more embodiments, the OLS filtering method uses block processing by splitting the input signal into overlapping windows and recombines complete non-overlapping components. Given frequency domain signal, $u_m[\tau]\in\mathbb{C}^K$, and frequency domain filter, $w_m[\tau]\in\mathbb{C}^K$, the frequency and time output for the $m^{th}$ channel, respectively can be expressed as:

$$y_m[\tau]=\mathrm{diag}(u_m[\tau])Z_w w_m[\tau]\in\mathcal{L}^K$$

$$y_m[\tau]=Z_y y_m[\tau]\in\mathbb{R}^R$$

where $Z_w=F_K T_R^T T_R F_K^{-1}\in\mathbb{C}^{K\times K}$ and $Z_y=\overline{T}_R F_K^{-1}\in\mathbb{C}^{R\times K}$ are anti-aliasing matrices, $T_R=[I_{K-R}, 0_{K-R\times R}]\in\mathbb{C}^{K-R\times K}$ trims the last R samples from a vector and $T_R=[0_{K-R\times R}, I_{K-R}]\in\mathbb{R}^{K-R\times K}$ trims the first R samples.

In one or more embodiments, the OLA filtering method computes the frequency and time output, and buffer update as:

$$y_m[\tau]=\mathrm{diag}(u_m[\tau])w_m[\tau]\in\mathbb{C}^K$$

$$y_m[\tau]=T_R F_K^{-1} y_m[\tau]+\overline{T}_R b_m[\tau-1]\in\mathbb{R}^R$$

$$b_m[\tau]=F_K^{-1} y_m[\tau]+T_R^T\overline{T}_R b_m[\tau-1]\in\mathbb{R}^K$$

In one or more embodiments, the forward and inverse DFTs are combined with analysis and synthesis windows (e.g., Hann windows) and optionally zero-padded. For multi-frame frequency-domain filters, the (anti-aliased) filter is $w_m[\tau]\in\mathbb{C}^{K\times BM}$, with B buffered frequency frames, the input is $\tilde{u}[\tau]\in\mathbb{C}^{K\times BM}$ and the output is $y_m[\tau]=(\tilde{u}[\tau]\odot w_m[\tau])1_{BM\times 1}$.

In one or more embodiments, the MDF filter includes frequency domain filter coefficients, $W\in\mathbb{C}^{M\times N}$, where M is the number of delayed blocks, N is the fast Fourier transform (FFT) size, $$P = M\cdot\frac{N}{2}$$

is the number of filter parameters, and L is the filter length in samples. The filter matrix is applied to the delayed frequency domain near-end inputs, $U\in\mathbb{C}^{M\times N}$, to yield a filtered output via $$y_n = \text{last } \frac{N}{2} \text{ terms of } \{FFT^{-1}((W\odot U)^T 1_N)\},$$

where T is a matrix transpose, ⊙ is the Hadamard product, and $1_N$ is an N×1 matrix of ones. To construct U, the time-domain near-end signal is buffered to length N with time overlap R, forming $u_{\bar{n}}\in\mathbb{R}^N$, shift $U_m=U_{m+1}$, for m=1 to M−1, and assign $U_m=\mathrm{FTT}(u_{\bar{n}})$. Finally, W is anti-aliased after each update so that each block has $$\frac{N}{2}$$

nonzero time-domain parameters. In one or more embodiments, for nonlinearity extension, each element $u_n$ of the far-end reference signal can be preprocessed through a parametric sigmoid as follows:

$$\gamma(u_n) = \alpha_4\left(\frac{2}{1 + \exp\left(\alpha_2\hat{u}_n + \alpha_3\hat{u}_n^2\right)} - 1\right)$$

where $\hat{u}_n=(u_n\cdot\alpha_1)/(\sqrt{|u_n|^2+|\alpha_1|^2})$ and $\alpha_i \forall i$ are adapted. In some embodiments, a general non-linear function, such as a small neural network, can be used.

After generating the estimated response 214, the filter 210 can send the estimated response 214 to an output manager 219, as shown at numeral 7. The estimated response 214 can then be sent as output signal 230, as shown at numeral 8.

The output of the filter 210 is also sent to an adaptive filter loss 216, as shown at numeral 9. The input manager 203 sends the target response 212 to the adaptive filter loss 216, as shown at numeral 10. The adaptive filter loss 216, or optimizee loss, can be calculated using the target response 212 and the estimated response 214, at numeral 11. In one or more embodiments, the adaptive filter loss 216 is the mean squared error (MSE) between the target response 212, $d[\tau]$, and the estimated response 214, $h_{\theta[\tau]}(u[\tau])$. The adaptive filter loss 216 can be represented as:

$$\mathcal{L}(d[\tau], h_{\theta[\tau]}(u[\tau]))$$

The adaptive filter loss 216 can also generate an error 220 (e.g., an error signal, $e[\tau]$) that is sent to an error manager 217, as shown at numeral 12. The error manager 217 can output the error 220, as shown at numeral 13.

The adaptive filter loss 216 can then be provided to the learned adaptive filter optimizer 218, $g_\phi$, to determine an update to the weights of the filter 210, as shown at numeral 12. In one or more embodiments, only the adaptive filter loss 216 generated in numeral 11 is sent to the learned adaptive filter optimizer 218.

In other embodiments, in addition to the adaptive filter loss 216, other signals are sent to the learned adaptive filter optimizer 218. In some embodiments, the system input 204 and the target response 212 are sent to the learned adaptive filter optimizer 218 by the input manager 201, as shown at numeral 15. In one or more embodiments, the system input 204 can be sent to the adaptive filter loss 216 (e.g., via the filter 210) and then passed to the learned adaptive filter optimizer 218 (e.g., as part of numeral 14). Similarly, in one or more embodiments, the target response 212 can be passed to the learned adaptive filter optimizer 218 (e.g., as part of numeral 14). In addition, the estimated response 214 and error 220 can be sent with the adaptive filter loss 216 at numeral 14. In such embodiments, by sending the additional input signals to the learned adaptive filter optimizer 218, the meta-adaptive filter 205 can leverage additional information and automatically fuse such signals together to achieve a more powerful learned adaptive filter optimizer 218.

As described previously, the learned adaptive filter optimizer 218 is a neural network trained to generate an adaptive filter weight update for the filter 210. In one or more embodiments, the learned adaptive filter optimizer 218 is an online optimizer trained to optimize the filter 210 (e.g., the optimizee) by determining the filter weight update, at numeral 16. The learned adaptive filter optimizer 218, $g_\phi(\cdot)$, includes one or more input signals parameterized by weights $\phi$ that iteratively optimizes the adaptive filter loss 216, $\mathcal{L}(\cdot, h_\theta(\cdot))$.

Given dataset $\mathcal{D}$, an optimal adaptive filter optimizer, $g_{\hat{\phi}}$, can be determined by:

$$g_{\hat{\phi}} = \arg\min_{g_\phi} E_{\mathcal{D}}[\mathcal{L}_M(g_\phi, \mathcal{L}(\cdot, h_\theta))]$$

where $\mathcal{L}_M(g_\phi, \mathcal{L}(\cdot, h_\theta))$ is the meta-adaptive filter loss that is a function of the learned adaptive filter optimizer 218, $g_\phi$, the filter architecture, $h_\theta$, and adaptive filter loss 216, $\mathcal{L}$.

The weight, $\theta$, of the filter 210 can then be updated via an additive update rule of the form:

$$\theta[\tau+1]=\theta[\tau]+g_\phi(\cdot)$$

where $\theta[\tau]$ are the filter parameters at time $\tau$ and $g_\phi(\cdot)$ is the update received from the learned adaptive filter optimizer 218.

In one or more embodiments, the learned adaptive filter optimizer 218 is a generalized, stochastic variant of an RLS-like optimizer that is applied independently per frequency k to the optimizee parameters but coupled across channels and time frames to model interactions between channels and frames and vectorize across frequency. A recurrent neural network (RNN) is used where the weights, $\phi$, are shared across all frequency bins, but maintain separate states, $\psi_k[\tau]$, are maintained per frequency. In embodiments where the learned adaptive filter optimizer 218 receives additional input signals, the input to the learned adaptive filter optimizer 218 is a vector of gradients plus other inputs (e.g., input signal u, etc.) and the output of the learned adaptive filter optimizer 218 is a vector of gradients plus other inputs (e.g., input signal u, etc.). In one or more embodiments, the inputs to the learned adaptive filter optimizer 218 at frequency k can be expressed as:

$$\xi_k[\tau]=\{\nabla_k[\tau], u_k[\tau], d_k[\tau], y_k[\tau]\}$$

where $\nabla_k[\tau]$ is the gradient of optimizee (e.g., the filter 210) with respect to $\theta_k$. The outputs of the learned adaptive filter optimizer 218 are the update to the gradient, $\Delta_k[\tau]$ and the updated internal state, $\psi_k[\tau+1]$, resulting in:

$$(\Delta_k[\tau], \psi_k[\tau+1])=g_\phi(\xi_k[\tau], \psi_k[\tau])$$

$$\theta_k[\tau+1]=\theta_k+\Delta_k[\tau]$$

In one or more embodiments, the input to the learned adaptive filter optimizer 218 is a single gradient (e.g., for an independent point in time) and the output of the learned adaptive filter optimizer 218 is a single updated gradient. However, in other embodiments, the input to the learned adaptive filter optimizer 218 is a vector of gradients (e.g., for a buffer period of time) and the output of the learned adaptive filter optimizer 218 is a vector of updated gradients.

In one or more embodiments, the RNN is defined by a small network composed of a linear layer, nonlinearity, and two Gated Recurrent Unit (GRU) layers is used, followed by two additional linear layers with nonlinearities, where all layers are complex-valued. Prior to the input, the error 220, $e_k[\tau]$, is computed, where $e_k[\tau]=d_k[\tau]-y_k[\tau]$, all input signals, $\xi_k[\tau]$, are stacked with $e_k[\tau]$ into a single vector, and the input vector magnitudes are approximately whitened element-wise via $\ln(1+|\nabla|)e^{j\angle\nabla}$ to reduce the dynamic range and facilitate training but keep the phases unchanged.

In one or more embodiments, two meta losses, $\mathcal{L}_M(\cdot)$, are examined to learn optimizer parameters, $\phi$. First, a frequency-domain frame independent loss is defined as:

$$\mathcal{L}_M = \ln \frac{1}{L} \sum_{\tau}^{\tau+L} E\left[|d[\tau] - y[\tau]|^2\right]$$

where d[τ] and y[τ] are the desired and estimated frequency-domain signal vectors. To compute this loss for a given optimizer, $g_\phi$, $\theta[\tau+1]=\theta[\tau]+g_\phi(\cdot)$ is run for a time horizon of L time frames (e.g., an unroll length), compute the average frequency-domain mean-squared error over L frames, and then take the logarithm to reduce the dynamic range. In one or more embodiments, this loss ignores the temporal order of adaptive filter updates and optimizes for filter coefficients that are unaware of any downstream STFT processing.

Then, a time-domain frame accumulated loss is defined as:

$$\mathcal{L}_M = \ln E[|\bar{d}[\tau]-\bar{y}[\tau]|^2]$$

$$\bar{d}[\tau]=vec(\underline{d}[\tau],\underline{d}[\tau+1], \ldots \underline{d}[\tau+L]) \in R^{RL\times M}$$

$$\bar{y}[\tau]=vec(\underline{y}[\tau],\underline{y}[\tau+1], \ldots \underline{y}[\tau+L]) \in R^{RL\times M}$$

where $\bar{d}[\tau]$ and $\bar{y}[\tau]$ are the time-domain desired and estimated responses. To compute this loss for a given optimizer, $g_\phi \theta[\tau+1]=\theta[\tau]+g_\phi(\cdot)$ is run for a time horizon of L time frames (e.g., an unroll length), concatenate the sequence of time-domain outputs and target signals to form longer signals, then compute the time-domain MSE loss, and take the logarithm. While both the frequency-domain frame independent loss and the time-domain frame accumulated loss use the same time-horizon, the frame accumulated loss models boundaries between adjacent updates and implicitly learns update that are short-time Fourier filtering (STFT) consistent.

The output of the learned adaptive filter optimizer 218 is sent to the filter 210, as shown at numeral 17. The filter weights, θ, of the filter 210 are then updated using the output of the learned adaptive filter optimizer 218 to better model the acoustic environment 202. Using the updated filter weights, the filter 210 can generate an updated estimated response 214, as described above with respect to numeral 6. The updated estimated response 214 can then be sent as an output 230 as described above with respect to numerals 7 and 8.

Figure 3:
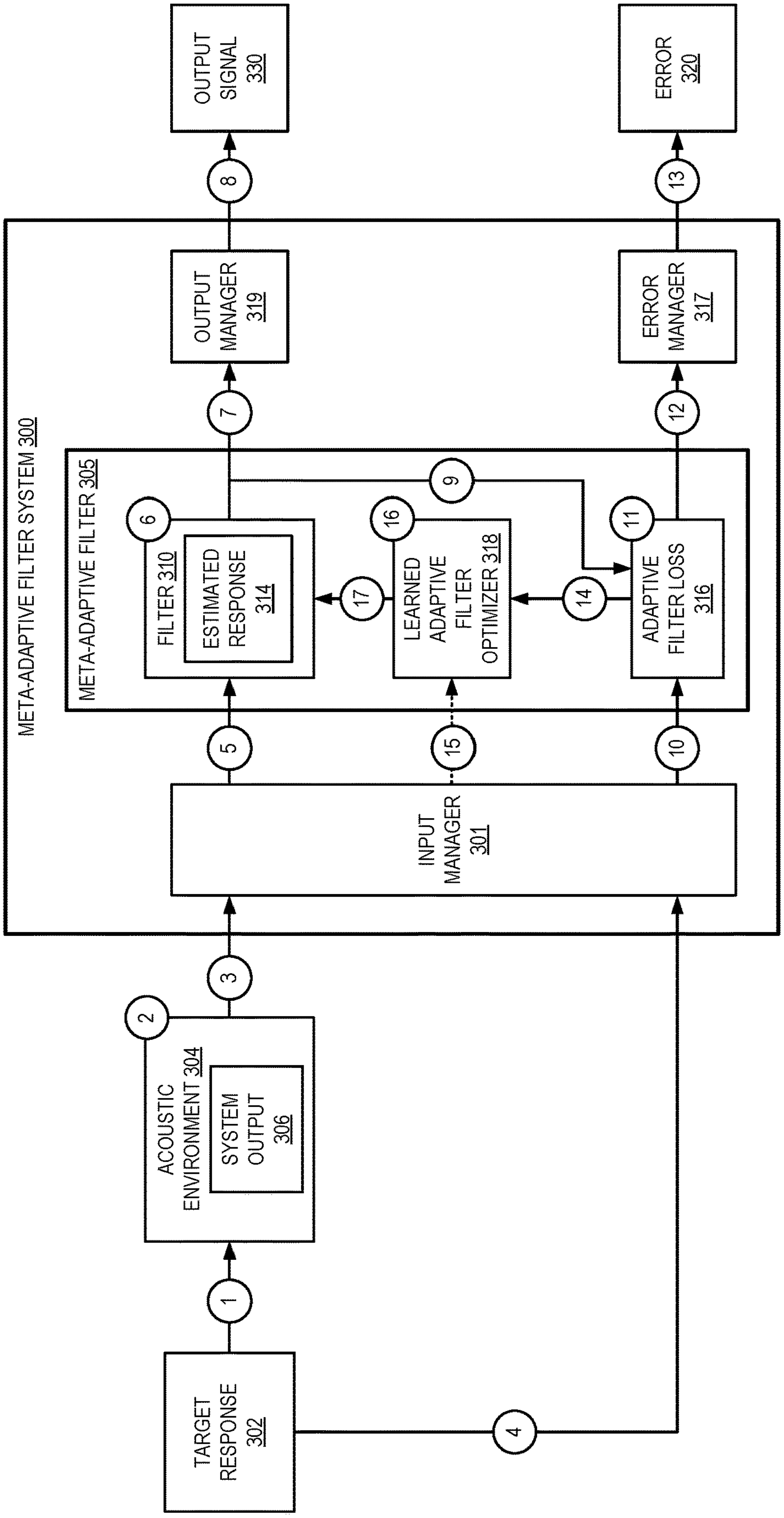
FIG. 3 illustrates a diagram of a trained meta-adaptive filter system used to perform an inverse modeling task of equalization in accordance with one or more embodiments.

FIG. 3 illustrates a diagram of a trained meta-adaptive filter system 300 used to perform an inverse modeling task of equalization in accordance with one or more embodiments. Equalization is typically used to estimate the inverse of an unknown transfer function, while observing inputs and outputs of the forward system. The goal of equalization is to estimate an adaptive filter (e.g., filter 310) that undoes the filter of the acoustic environment 304.

As illustrated in FIG. 3, a target response 302, d[τ], is fed to an acoustic environment 304 (e.g., an acoustic room), as shown at numeral 1. For example, target response 302 can be an original audio signal that is passed through the acoustic environment 304 (e.g., from a speaker in a room). A system output 306 is an audio signal detected or picked up by a microphone in the room (e.g., at a listening location where the user wants to tune the system to) after propagating through the acoustic environment 304 from the speaker, at numeral 2. The system output 306 is a sub-optimal version of the original audio signal (e.g., target response 302) created by the original audio signal's propagation through the acoustic environment 304. For example, the system output 306 can include additional echoes, background noises, etc. As illustrated in FIG. 3, the system output 306, u[τ], is fed to an input manager 301 of a meta-adaptive filter system 300, as shown at numeral 3.

In one or more embodiments, while the system output 306 is sent to the input manager 301 of the meta-adaptive filter system 300, the sub-optimal version of the original audio signal (e.g., target response 302) is passed to the input manager 301, as shown at numeral 4. Although FIG. 3 depicts a single input manager 301, in one or more embodiments, the input manager that receives the target response 302 can be a different input manager than the input manager that receives the system output 306.

In one or more embodiments, the input manager 301 that received the system output 306 is configured to receive inputs (e.g., audio signals) and pass them to a meta-adaptive filter 305, as shown at numeral 5. In one or more embodiments, the meta-adaptive filter 305 includes a filter 310 that includes weights that are adapted, an adaptive filter loss 316, and a learned adaptive filter optimizer 318 that is trained to determine an update rule that is used to adapt the weights of the filter 310 to minimize loss using the adaptive filter loss 316.

In one or more embodiments, the filter 310 is a short-time Fourier transform (STFT) filter. STFT filters are filters in the frequency domain that include one or more delayed blocks. STFT filters can also be referred to as multi-delayed filters. In one or more other embodiments, the filter 310 can be a time-domain filter or a lattice filter. The filter 310 models the acoustic environment 304 with a linear frequency-domain filter, $h_\theta$, and generates an output (e.g., estimated response 314, y[τ]), at numeral 6. The goal is to optimize the filter 310 such that the estimated response 314 closely resembles the target response 302 (e.g., any additional sounds, distortions, etc. that are added to the original audio signal when passing through the acoustic environment 304 are removed). The transfer function of the filter 310 can be expressed as:

$$h_{\theta[\tau]}(u[\tau])$$

where θ is a filter weight of the filter 310.

After generating the estimated response 314, the filter 310 can send the estimated response 314 to an output manager 319, as shown at numeral 7. The estimated response 314 can then be sent as output signal 330, as shown at numeral 8.

The output of the filter 310 is also sent to the adaptive filter loss 316, as shown at numeral 9. The input manager 303 sends the target response 302 to the adaptive filter loss 316, as shown at numeral 10. The adaptive filter loss 316, or optimizee loss, can be calculated using the target response 302 and the estimated response 314, at numeral 11. In one or more embodiments, the adaptive filter loss 316 is the mean square error (MSE) between the target response 302 and the estimated response 314. The adaptive filter loss 316 can be represented as:

$$\mathcal{L}(d[\tau], h_{\theta[\tau]}(u[\tau]))$$

The adaptive filter loss 316 can also generate an error 320 (e.g., an error signal, e[τ]) that is sent to an error manager 317, as shown at numeral 12. The error manager 317 can output the error 320, as shown at numeral 13.

The adaptive filter loss 316 can then be provided to the learned adaptive filter optimizer 318, $g_\phi$, to determine an update to the weights of the filter 310, as shown at numeral 14. In one or more embodiments, only the adaptive filter loss 316 generated in numeral 11 is sent to the learned adaptive filter optimizer 318.

In other embodiments, in addition to the adaptive filter loss 316, other signals are sent to the learned adaptive filter optimizer 318. In some embodiments, the system output 306 and the target response 302 are sent to the learned adaptive filter optimizer 318 by the input manager 301, as shown at numeral 15. In one or more embodiments, the system output 306 can be sent to the adaptive filter loss 316 (e.g., via the filter 310) and then passed to the learned adaptive filter optimizer 318 (e.g., as part of numeral 14). Similarly, in one or more embodiments, the target response 302 can be passed to the learned adaptive filter optimizer 318 (e.g., as part of numeral 14). In addition, the estimated response 314 and error 320 can be sent with the adaptive filter loss 316 at numeral 14. In such embodiments, by sending the additional input signals to the learned adaptive filter optimizer 318, the meta-adaptive filter 305 can leverage additional information and automatically fuse such signals together to achieve a more powerful learned adaptive filter optimizer 318.

As described previously, the learned adaptive filter optimizer 318 is a neural network trained to optimize the filter 310 (e.g., the optimizee) by determining the filter weight update, at numeral 16. In one or more embodiments, the process of determining the filter weights for the filter 310 is as described with respect to numeral 17 of FIG. 1, using one or more of the gradient of the adaptive filter loss, the system output 306, u[τ], the target response 302, d[τ], the estimated response 314, y[τ], and the error signal 320, e[τ]).

The output of the learned adaptive filter optimizer 318 is sent to the filter 310, as shown at numeral 17. The filter weights, θ, of the filter 310 are then updated using the output of the learned adaptive filter optimizer 318 to better model the acoustic environment 304. Using the updated filter weights, the filter 310 can generate an updated estimated response 314, as described above with respect to numeral 6. The updated estimated response 314 can then be sent as an output 330 as described above with respect to numerals 7 and 8.

Figure 4:
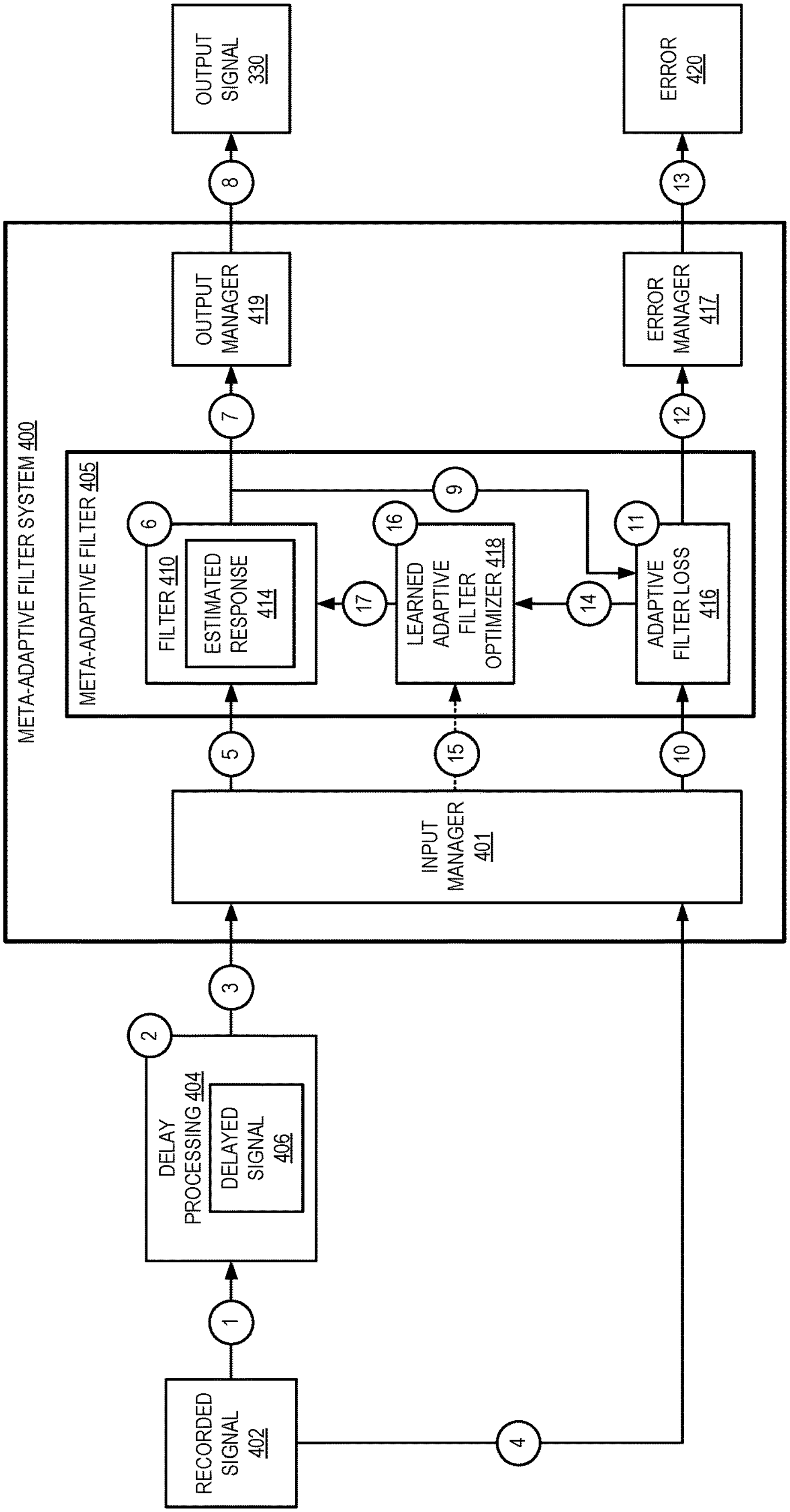
FIG. 4 illustrates a diagram of a trained meta-adaptive filter system used to perform dereverberation in accordance with one or more embodiments.

FIG. 4 illustrates a diagram of a trained meta-adaptive filter system 400 used to perform dereverberation in accordance with one or more embodiments. Dereverberation can be performed via a multi-channel linear prediction (MCLP), or a weighted prediction error (WPE), formulation. The WPE formulation is based on being able to predict the reverberant part of a signal from a linear combination of past samples, most commonly in the frequency-domain. In one or more embodiments, a multi-channel linear frequency domain filter, $h_\theta$, is used, and filter weights, θ, are adapted using a learned adaptive filter optimizer 418 to minimize the normalized MSE adaptive filter loss 416.

As illustrated in FIG. 4, a recorded signal 402, d[τ], is an audio signal that has been received (e.g., by one or more microphones). In one or more embodiments, the recorded signal 402 can be a vector of multi-channel signals. For example, recorded signal 402 can be an audio signal as recorded by a plurality of microphones. The recorded signal 402 is transmitted, as shown at numeral 1. A delay processing 404, $z^{-D}$, is then applied to the recorded signal 402 resulting in delayed signal 406, at numeral 2. In one or more embodiments, the delay processing 404 is a buffer of the audio signal over the previous D time frames. For example, the delayed processing 404 can include five previous frames of audio for each frame of audio is the recorded signal 402. Assuming that each processing block of the recorded signal 402 includes 20 frames of audio, the delayed signal 406 will be 100 frames of audio.

As illustrated in FIG. 4, the delayed signal 406, u[τ], is fed to an input manager 401 of a meta-adaptive filter system 400, as shown at numeral 3.

In one or more embodiments, while the delayed signal 406 is sent to the input manager 401 of the meta-adaptive filter system 400, the recorded signal 402 is passed to an input manager 401, as shown at numeral 4. Although FIG. 4 depicts a single input manager 401, in one or more embodiments, the input manager that receives the recorded signal 402 can be a different input manager than the input manager that receives the delayed signal 406.

In one or more embodiments, the input manager 401 that received the delayed signal 406 is configured to receive inputs (e.g., audio signals) and pass them to a meta-adaptive filter 405, as shown at numeral 5. In one or more embodiments, the meta-adaptive filter 405 includes a filter 410 that includes weights that are adapted, an adaptive filter loss 416, and a learned adaptive filter optimizer 418 that is trained to determine an update rule that is used to adapt the weights of the filter 410 to minimize loss using the adaptive filter loss 416.

In one or more embodiments, the filter 410 is a short-time Fourier transform (STFT) filter. STFT filters are filters in the frequency domain that include one or more delayed blocks. STFT filters can also be referred to as multi-delayed filters. In one or more other embodiments, the filter 410 can be a time-domain filter or a lattice filter. The filter 410 uses linear frequency-domain filter, $h_\theta$, to remove reverberation from the delayed signal 406 to generate estimated response 414, y[τ], at numeral 6. The transfer function of the adaptive filter 410 can be expressed as:

$$h_{\theta[\tau]}(u[\tau])$$

where θ is a filter weight of the filter 410.

Assuming an array of M microphones, a dereverberated signal can be estimated with a linear model via:

$$\hat{d}_{km}[\tau]=d_{km}[\tau]-w_{km}[\tau]^H\tilde{u}_k[\tau]$$

where $\hat{d}_{km}[\tau]\in\mathbb{C}$ is the current dereverberated signal estimate at frequency k and channel m, $d_{km}[\tau]\in\mathbb{C}$ is the input microphone signal (e.g., recorded signal 402), $w_{km}[\tau]\in\mathbb{C}^{BM\times 1}$ is a per frequency filter with B time frames and M channels flattened into a vector, and $\tilde{u}_k[\tau]=d_k[\tau-D]\in\mathbb{C}^{BM\times 1}$ is a running buffer of $d_{km}[\tau]$, delayed by D frames.

After generating the estimated response 414, the filter 410 can send the estimated response 414 to an output manager 419, as shown at numeral 7. The estimated response 414 can then be sent as output signal 430, as shown at numeral 8.

The output of the filter 410 is also sent to the adaptive filter loss 416, as shown at numeral 9. The input manager 403 sends the recorded signal 402 to the adaptive filter loss 416, as shown at numeral 10. The adaptive filter loss 416, or optimizee loss, can be calculated using the recorded signal 402 and the estimated response 414, at numeral 11. In one or more embodiments, a per channel and frequency loss are then minimized as follows:

$$\mathcal{L}(\hat{d}_{km}[\tau], \lambda_k[\tau]) = \frac{\|\hat{d}_{km}[\tau]\|^2}{\lambda_k^2[\tau]}$$

$$\lambda_k^2[\tau] = \frac{1}{M(B+D)}\sum_{n=\tau-B-D}^{\tau} d_k[n]^H d_k[n]$$

where $\lambda_k^2[\tau]$ is a running average estimate of the signal power and $d_k[\tau]\in\mathbb{C}^{M\times 1}$.

The adaptive filter loss 416 can also generate an error 420 (e.g., an error signal, e[τ]) that is sent to an error manager 417, as shown at numeral 12. The error manager 417 can output the error 420, as shown at numeral 13.

The adaptive filter loss 416 can then be provided to the learned adaptive filter optimizer 418, $g_\phi$, to determine an update to the weights of the filter 410, as shown at numeral 14. In one or more embodiments, only the adaptive filter loss 416 generated in numeral 11 is sent to the learned adaptive filter optimizer 4.

In other embodiments, in addition to the adaptive filter loss 416, other signals are sent to the learned adaptive filter optimizer 418. In some embodiments, the delayed signal 406 and the recorded signal 402 are sent to the learned adaptive filter optimizer 418 by the input manager 401, as shown at numeral 15. In one or more embodiments, the delayed signal 406 can be sent to the adaptive filter loss 416 (e.g., via the filter 410) and then passed to the learned adaptive filter optimizer 418 (e.g., as part of numeral 14). Similarly, in one or more embodiments, the recorded signal 402 can be passed to the learned adaptive filter optimizer 418 (e.g., as part of numeral 14). In addition, the estimated response 414 and error 420 can be sent with the adaptive filter loss 416 at numeral 14. In such embodiments, by sending the additional input signals to the learned adaptive filter optimizer 418, the meta-adaptive filter 405 can leverage additional information and automatically fuse such signals together to achieve a more powerful learned adaptive filter optimizer 418.

As described previously, the learned adaptive filter optimizer 418 is a neural network trained to optimize the filter 410 (e.g., the optimizee) by determining the filter weight update, at numeral 16. In one or more embodiments, the process of determining the filter weights for the filter 410 is as described with respect to numeral 17 of FIG. 1, using one or more of the gradient of the adaptive filter loss, the delayed signal 406, u[τ], the recorded signal 402, d[τ], the estimated response 414, y[τ], and the error signal 420, e[τ]).

The output of the learned adaptive filter optimizer 418 is sent to the filter 410, as shown at numeral 17. The filter weights, θ, of the filter 410 are then updated using the output of the learned adaptive filter optimizer 418. Using the updated filter weights, the filter 410 can generate an updated estimated response 414, as described above with respect to numeral 6. The updated estimated response 414 can then be sent as an output 430 as described above with respect to numerals 7 and 8.

Figure 5:
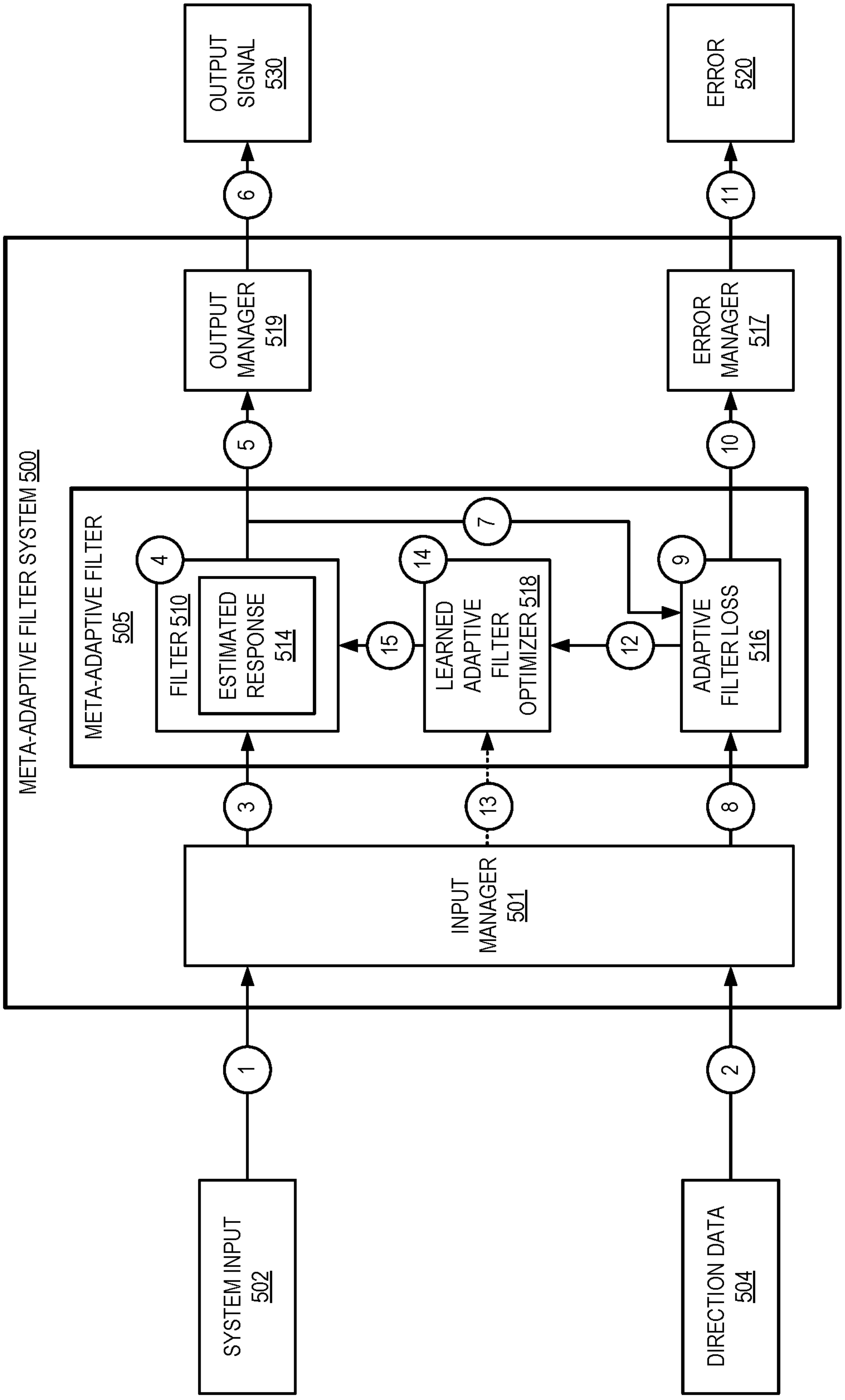
FIG. 5 illustrates a diagram of a trained meta-adaptive filter used to perform interference cancellation in accordance with one or more embodiments.

FIG. 5 illustrates a diagram of a trained meta-adaptive filter 500 used to perform interference cancellation in accordance with one or more embodiments. Interference cancellation can be performed using a minimum variance distortionless response (MVDR) beamformer. The MVDR beamformer can be implemented as an adaptive filter problem using the generalized sidelobe canceller (GSC) formulation. The goal of beamforming is to allow audio signals from particular directions while canceling out audio signals from other directions. For example, if a particular user is speaking, interference cancellation attempts to direct the beamformer in the direction of the speaker, while canceling out any signals from other directions (e.g., from interferers). In one or more embodiments, a linear frequency domain filter, $h_\theta$, is used, and filter weights, θ, are adapted using a learned adaptive filter optimizer 518 to minimize the normalized MSE adaptive filter loss 516. By doing so, the learned adaptive filter optimizer 518 is trained to listen in one direction and suppress interferers (e.g., directional and diffuse) from all others.

As illustrated in FIG. 5, a system input 502, u[τ], includes multiple audio signals from microphones. The system input 502 is fed to an input manager 501 of a meta-adaptive filter system 500, as shown at numeral 1. Direction data 504, d[τ], includes data indicating a target direction for listening. The direction data 504 is passed to the input manager 501, as shown at numeral 2. Although FIG. 5 depicts a single input manager 501, in one or more embodiments, the input manager that receives the direction data 504 can be a different input manager than the input manager that receives the system input 502.

In one or more embodiments, the input manager 501 that received the system input 502 is configured to receive inputs (e.g., audio signals) and pass them to a meta-adaptive filter 505, as shown at numeral 3. In one or more embodiments, the meta-adaptive filter 505 includes a filter 510 that includes weights that are adapted, an adaptive filter loss 516, and a learned adaptive filter optimizer 518 that is trained to determine an update rule that is used to adapt the weights of the filter 510 to minimize loss using the adaptive filter loss 516.

In one or more embodiments, the filter 510 is a short-time Fourier transform (STFT) filter. STFT filters are filters in the frequency domain that include one or more delayed blocks. STFT filters can also be referred to as multi-delayed filters. In one or more other embodiments, the filter 510 can be a time-domain filter or a lattice filter. The filter 510 uses linear frequency-domain filter, $h_\theta$, to generate an undistorted audio signal of interest (e.g., from a speaker with any audio signal from an interferer reduced or canceled out) as estimated response 514, y[τ], at numeral 4. The transfer function of the adaptive filter 510 can be expressed as:

$$h_{\theta[\tau]}(u[\tau])$$

where θ is a filter weight of the filter 510.

Assuming an array of M microphones, a time-domain signal model for microphone m can be as follows:

$$\underline{u}_m[t]=r_m[t]*\underline{s}[t]+n_m[t]$$

where $\underline{u}_m[t]\in\mathbb{R}$ is the input signal (e.g., system input 502), $\underline{n}_m[t]\in\mathbb{R}$ is the true desired signal, $s[t]\in\mathbb{R}$ is the true desired signal, and $r_m[t]\in\mathbb{R}$ is the impulse response from the source to microphone m. In the time-frequency domain with a sufficiently long window, this can be rewritten as:

$$u_{km}[\tau]=r_{km}[\tau]s_k[\tau]+n_{km}[\tau]$$

where k represents frequency and T represents the short-time frame.

In one or more embodiments, the GSC beamformer also assumes access to a steering vector, $v_k$. The steering vector can be estimated using the normalized first principal component of the source covariance matrix:

$$\tilde{v}_k[\tau]=\mathcal{P}(\phi_k^{ss}[\tau])$$

$$v_k[\tau]=v_k[\tau]/\tilde{v}_{k0}[\tau]$$

where $\phi_k^{SS}[\tau]\in\mathbb{C}^{M\times M}$ is an estimate of the covariance matrix for $s\in\mathbb{C}^M$, $\mathcal{P}(\cdot)$ extracts the principal component, and $v_k[\tau]\in\mathbb{C}^M$ is the final steering vector. Assuming access to s when computing, $$\phi_k^{SS}[\tau]=\gamma\phi_k^{SS}[\tau-1]+(1-\gamma)(s_k[\tau]s_k[\tau]^T+\lambda I_M)$$

where γ is a forgetting factor and A is a regularization parameter. The steering vector is then used to estimate a blocking matrix $B_k[\tau]$. The blocking matrix is orthogonal to the steering vector and can be constructed as $$B_k[\tau] = \begin{bmatrix} -\dfrac{[V_{k1}[\tau], \ldots, V_{kM}[\tau]]^H}{v_{k0}[\tau]^H} \\ I_{M-1 \times M-1} \end{bmatrix} \in \mathbb{C}^{M \times M-1}$$

The distortionless constraint can then satisfied by applying the GSC beamformer as:

$$y_k[\tau]=(v_k[\tau]-B_k[\tau]w_k[\tau]^H u_k[\tau]$$

where $w_k[\tau] \in \mathbb{C}^{M-1}$ is the adaptive filter weight, and the estimated response for the loss is:

$$d_k[\tau]=v_k[\tau]^H u_k[\tau]$$

After generating the estimated response 514, the filter 510 can send the estimated response 514 to an output manager 519, as shown at numeral 5. The estimated response 514 can then be sent as output signal 530, as shown at numeral 6.

The output of the filter 510 is also sent to the adaptive filter loss 516, as shown at numeral 7. The input manager 501 sends the direction data 504 to the adaptive filter loss 516, as shown at numeral 8. The adaptive filter loss 516, or optimizee loss, can be calculated using the direction data 504 and the estimated response 514, at numeral 9.

The adaptive filter loss 516 can also generate an error 520 (e.g., an error signal, e[τ]) that is sent to an error manager 517, as shown at numeral 10. The error manager 517 can output the error 520, as shown at numeral 11.

The adaptive filter loss 516 can then be provided to the learned adaptive filter optimizer 518, $g_\phi$, to determine an update to the weights of the filter 510, as shown at numeral 12. In one or more embodiments, only the adaptive filter loss 516 generated in numeral 9 is sent to the learned adaptive filter optimizer 518.

In other embodiments, in addition to the adaptive filter loss 516, other signals are sent to the learned adaptive filter optimizer 518. In some embodiments, the system input 502 and the direction data 504 are sent to the learned adaptive filter optimizer 518 by the input manager 501, as shown at numeral 13. In one or more embodiments, the system input 502 can be sent to the adaptive filter loss 516 (e.g., via the filter 510) and then passed to the learned adaptive filter optimizer 518 (e.g., as part of numeral 12). Similarly, in one or more embodiments, the direction data 504 can be passed to the learned adaptive filter optimizer 518 (e.g., as part of numeral 12). In addition, the estimated response 514 and error 520 can be sent with the adaptive filter loss 516 at numeral 12. In such embodiments, by sending the additional input signals to the learned adaptive filter optimizer 518, the meta-adaptive filter 505 can leverage additional information and automatically fuse such signals together to achieve a more powerful learned adaptive filter optimizer 518.

As described previously, the learned adaptive filter optimizer 518 is a neural network trained to optimize the filter 510 (e.g., the optimizee) by determining the filter weight update, at numeral 14. In one or more embodiments, the process of determining the filter weights for the filter 510 is as described with respect to numeral 17 of FIG. 1, using one or more of the gradient of the adaptive filter loss, the system input 502, u[τ], the direction data 504, d[τ], the estimated response 514, y[τ], and the error signal 520, e[τ]).

The output of the learned adaptive filter optimizer 518 is sent to the filter 510, as shown at numeral 15. The filter weights, θ, of the filter 510 are then updated using the output of the learned adaptive filter optimizer 518. Using the updated filter weights, the filter 510 can generate an updated estimated response 514, as described above with respect to numeral 4. The updated estimated response 514 can then be sent as an output 530 as described above with respect to numerals 5 and 6.

FIG. 6 is an example training algorithm 600 used to learn a learned adaptive filter optimizer in accordance with one or more embodiments. In one or more embodiments, training a meta-adaptive filter (e.g., meta-adaptive filter 105, meta-adaptive filter 205, etc.), includes learning the neural network weights of the learned adaptive filter optimizer, $g_\phi$. To do this, the optimizer weights, ϕ, are initialized to be random, the optimizer is applied to update an adaptive filter (e.g., filter 110, filter 210, etc.), and an output is generated for L time frames (e.g., 20 time frames). The inputs and outputs of the filter for the L frames are then aggregated and a loss is computed. Backpropagation is then used to estimate gradients with respect to the optimizer weights, ϕ, and a second optimizer (e.g., a meta-optimizer) is used to update ϕ. In one or more embodiments, this process is repeated until convergence using batches of input/output signals. Through this process, the learned optimizer weights, ϕ, result in a better learned optimizer, $g_\phi$, that then can be applied to update the weights of an adaptive filter at inference time. In one or more embodiments, short-time Fourier transform filtering is used for the structure of the adaptive filter, but other structures can be used in other embodiments.

Figure 7:
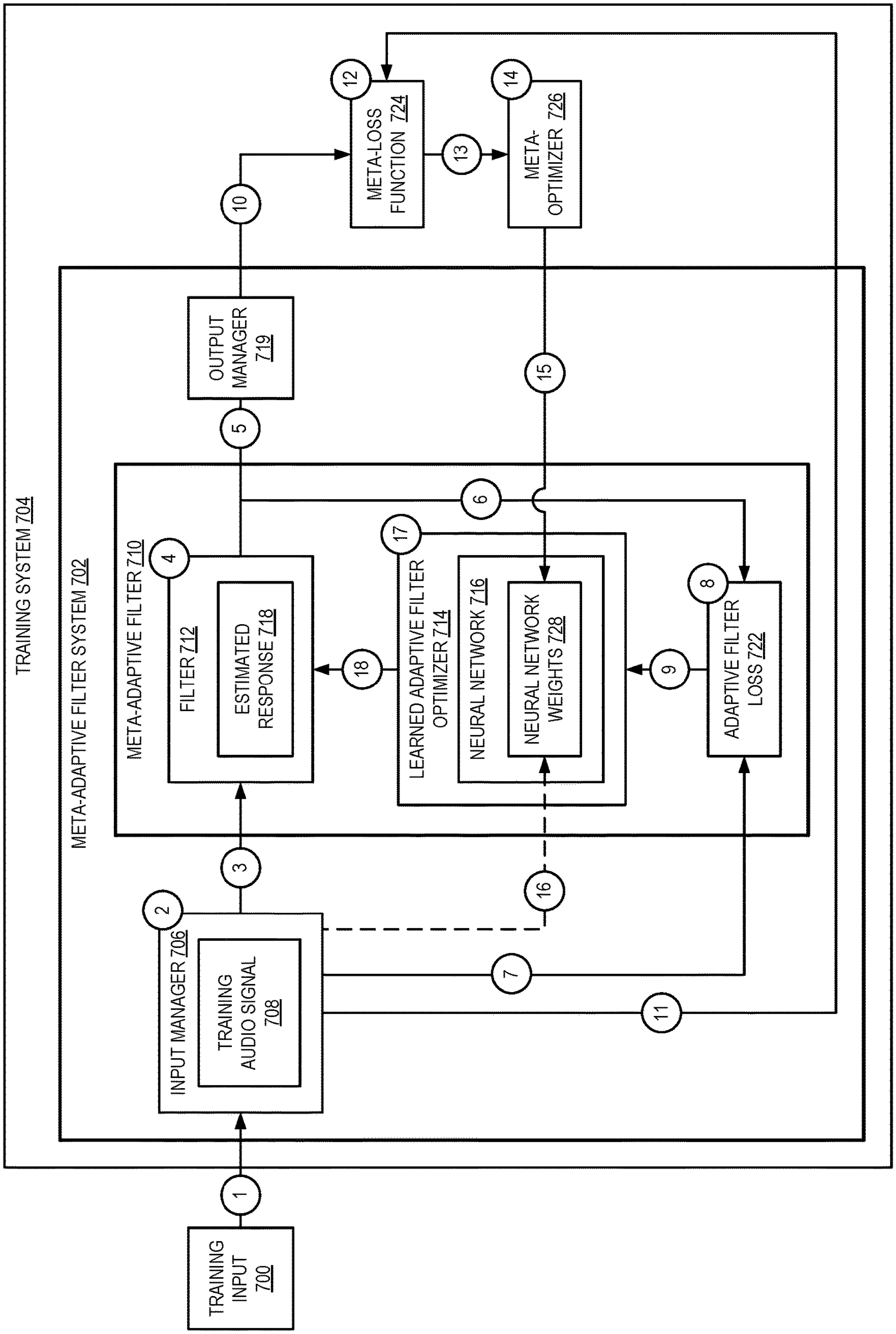
FIG. 7 illustrates a diagram of a method of training a learned adaptive filter optimizer to generate adaptive filter weights in accordance with one or more embodiments.

FIG. 7 illustrates a diagram of a method of training a learned adaptive filter optimizer to generate adaptive filter weights in accordance with one or more embodiments. As illustrated in FIG. 7 a training system 704 is used to pre-train a meta-adaptive filter system 702. The meta-adaptive filter system 702 receives a training input 700 which may include a training audio signal 708, as shown at numeral 1. The training input 700 can be received by an input manager 706, which identifies the training audio signal 708 from the training input 700, at numeral 2. The input manager 706 then sends the training audio signal 708 to a meta-adaptive filter 710, as shown at numeral 3.

The meta-adaptive filter 710 includes a filter 712, a learned adaptive filter optimizer 714, and an adaptive filter loss 722. The filter 712 includes adaptable filter weights that can be updated by filter weight updates generated by the learned adaptive filter optimizer 714. The learned adaptive filter optimizer 714 includes a neural network 716 (e.g., a recurrent neural network) for generating the filter weight updates for the adaptable filter weights of the filter 712. In one or more embodiments, the filter 712 generates an estimated response 718, at numeral 4, based on its current filter parameters. In one or more embodiments, the filter 712 is a short-time Fourier transform (STFT) filter. STFT filters are filters in the frequency domain that include one or more delayed blocks. STFT filters can also be referred to as multi-delayed filters. In one or more other embodiments, the filter 712 can be a time-domain filter or a lattice filter. In one or more embodiments, the filter 712 performs frequency-domain convolution via overlap-save or overlap-add short-time Fourier transform processing. After generating the estimated response, the estimated response 718 is sent to an output manager 719 configured to manage the output of the meta-adaptive filter 710, as shown at numeral 5. The estimated response 718 is then sent to the adaptive filter loss 722, as shown at numeral 6. The training audio signal 708 is sent to the adaptive filter loss 722, as shown at numeral 7. A loss is calculated by the adaptive filter loss 722 using the training audio signal 708 and the estimated response 718, at numeral 8. The output of the adaptive filter loss 722 is a gradient signal used as a feature or input to the learned optimizer 714 that can be backpropagated to the learned adaptive filter optimizer 714, as shown at numeral 9. In one or more embodiments, the backpropagation of the gradient signal is expressed in the algorithm of FIG. 6 as "$\nabla[\tau] \leftarrow \text{GRAD}(\mathcal{L}, \theta)$."

In one or more embodiments, the estimated response 718 is also sent outside the meta-adaptive filter system 702 to a meta-loss function 724, as shown at numeral 10. The training audio signal 708 is also sent to the meta-loss function 724, as shown at numeral 11. In one or more embodiments, the meta-loss function 724 computes a scalar value (e.g., a loss value). In one or more embodiments, the meta-loss function 724 is based on the adaptive filter loss 722. The meta-loss function 724 can include a loss based on the sum of the internal loss blocks in the frequency domain and another loss being a time-domain loss over the accumulated inputs/outputs. The loss generated by the meta-loss function 724 is then sent to a meta-optimizer 726, as shown at numeral 13. In one or more embodiments, the meta-optimizer 726 is a function that computes the gradient of the loss generated by the meta-loss function 724 with respect to the parameters of the learned adaptive filter optimizer weights, at numeral 14. The meta-optimizer 726 then computes an "update step" on how the adaptive filter optimizer weights (neural network weights 728) should be updated. The output of the meta-optimizer 726 can be backpropagated to the learned adaptive filter optimizer 714, as shown at numeral 15, to update the neural network weights 728. In one or more embodiments, the backpropagation of the gradient signal by the meta-optimizer 726 is expressed in the algorithm of FIG. 6 as "$\nabla \leftarrow \text{GRAD}(\mathcal{L}_M, \phi)$."

In one or more embodiments, in addition to the adaptive filter loss 722 and the output of the meta-optimizer 726, other signals are sent to the learned adaptive filter optimizer 714. In some embodiments, the training audio signal 708 is sent to the learned adaptive filter optimizer 714 by the input manager 706, as shown at numeral 16. In one or more embodiments, the training audio signal 708 can be sent to the adaptive filter loss 722 (e.g., via the filter 712) and then passed to the learned adaptive filter optimizer 714 (e.g., as part of numeral 9). In such embodiments, by sending the additional input signals to the learned adaptive filter optimizer 714, the meta-adaptive filter 710 can leverage additional information and automatically fuse such signals together to achieve a more powerful learned adaptive filter optimizer 714.

The learned adaptive filter optimizer 714 can then adapt the neural network weights 728 of the neural network 716 to generate an improved filter weight update, at numeral 17. The filter weight update can be sent to the filter 712 to update the adaptable filter weights of the filter 712, as shown at numeral 18. Once updated, the filter 712 can generate an updated estimated response 718 using the updated adaptable filter weights. The process can continue recursively to improve the performance of the filter 712.

In one or more embodiments, during the training process the filter 712 and the learned adaptive filter optimizer 714 can function as a single neural network. The network weights of the learned adaptive filter optimizer 714 can change during training, but are then fixed during inference, while another part of the network has weights that can constantly change during both training and inference (e.g., the filter weights). In an alternative embodiment, after training, only the learned adaptive filter optimizer 714 is the neural network that controls the filter 712, where the filter 712 is outside of the neural network.

Figure 8:
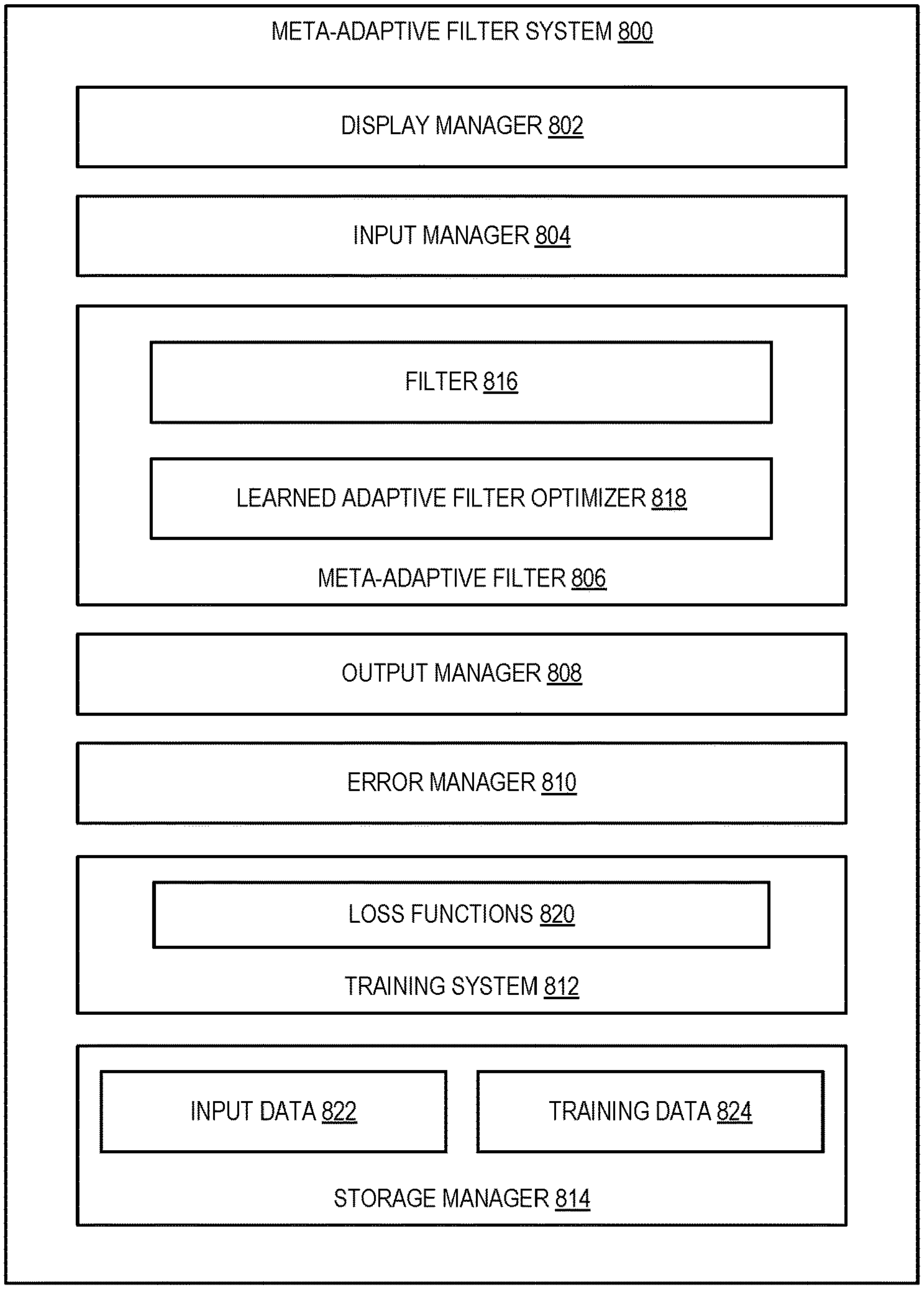
FIG. 8 illustrates a schematic diagram of a meta-adaptive filter in accordance with one or more embodiments.

FIG. 8 illustrates a schematic diagram of a meta-adaptive filter system (e.g., "meta-adaptive filter system" described above) in accordance with one or more embodiments. As shown, the meta-adaptive filter system 800 may include, but is not limited to, a display manager 802, an input manager 804, a meta-adaptive filter 806, an output manager 808, an error manager 810, a training system 812, and a storage manager 814. As shown, the meta-adaptive filter 806 includes a filter 816 and a learned adaptive filter optimizer 818. The training system 812 include loss functions 820. The storage manager 814 includes input data 822 and training data 824.

As illustrated in FIG. 8, the meta-adaptive filter system 800 includes a display manager 802. In one or more embodiments, the display manager 802 identifies, provides, manages, and/or controls a user interface provided on a touch screen or other device. Examples of displays include interactive whiteboards, graphical user interfaces (or simply "user interfaces") that allow a user to view and interact with content items, or other items capable of display on a touch screen. For example, the display manager 802 may identify, display, update, or otherwise provide various user interfaces that include one or more display elements in various layouts. In one or more embodiments, the display manager 802 can identify a display provided on a touch screen or other types of displays (e.g., including monitors, projectors, headsets, etc.) that may be interacted with using a variety of input devices. For example, a display may include a graphical user interface including one or more display elements capable of being interacted with via one or more touch gestures or other types of user inputs (e.g., using a stylus, a mouse, or other input devices). Display elements include, but are not limited to buttons, text boxes, menus, thumbnails, scroll bars, hyperlinks, etc.

As further illustrated in FIG. 8, the meta-adaptive filter system 800 also includes an input manager 804. The input manager 804 may be configured to receive input audio signals transmitted to the meta-adaptive filter system 800 and direct such input audio signals to the meta-adaptive filter 806.

As further illustrated in FIG. 8, the meta-adaptive filter system 800 also includes meta-adaptive filter 806. The meta-adaptive filter 806 includes at least a filter 816 and a learned adaptive filter optimizer 818. In one or more embodiments, the filter 816 includes weights that are adapted (e.g., to model an acoustic environment). The learned adaptive filter optimizer 818 is trained to determine an update rule (e.g., using an output signal of the filter 816 and a target response signal) that is used to adapt the weights of the filter 816 to minimize loss. In one or more embodiments, the filter 816 and the learned adaptive filter optimizer 818 are neural networks. In one or more embodiments, a neural network includes deep learning architecture for learning representations of audio and/or video. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

As further illustrated in FIG. 8, the meta-adaptive filter system 800 also includes an output manager 808. The output manager 808 may be configured to receive output audio signals generated by the meta-adaptive filter 806 and direct such output audio signals to a receiver (e.g., a speaker, etc.).

As further illustrated in FIG. 8, the meta-adaptive filter system 800 also includes an error manager 810. The error manager 810 may be configured to receive an error signal (e.g., an adaptive filter loss) generated by the meta-adaptive filter system 800. The error manager 810 can transmit the error signal to a receiver.

As further illustrated in FIG. 8, the meta-adaptive filter system 800 includes training system 812 which is configured to teach, guide, tune, and/or train one or more neural networks. In particular, the training system 812 trains the meta-adaptive filter 806 based on training data.

As further illustrated in FIG. 8, the storage manager 814 includes input data 822 and training data 824. In particular, the input data 822 may include an input audio signals received by the meta-adaptive filter system 800. In one or more embodiments, the training data 824 may include audio signals that can be used during a training process of the meta-adaptive filter system 800 to train one or more neural networks.

Each of the components 802-814 of the meta-adaptive filter system 800 and their corresponding elements (as shown in FIG. 8) may be in communication with one another using any suitable communication technologies. It will be recognized that although components 802-814 and their corresponding elements are shown to be separate in FIG. 8, any of components 802-814 and their corresponding elements may be combined into fewer components, such as into a single facility or module, divided into more components, or configured into different components as may serve a particular embodiment.

The components 802-814 and their corresponding elements can comprise software, hardware, or both. For example, the components 802-814 and their corresponding elements can comprise one or more instructions stored on a computer-readable storage medium and executable by processors of one or more computing devices. When executed by the one or more processors, the computer-executable instructions of the meta-adaptive filter system 800 can cause a client device and/or a server device to perform the methods described herein. Alternatively, the components 802-814 and their corresponding elements can comprise hardware, such as a special purpose processing device to perform a certain function or group of functions. Additionally, the components 802-814 and their corresponding elements can comprise a combination of computer-executable instructions and hardware.

Furthermore, the components 802-814 of the meta-adaptive filter system 800 may, for example, be implemented as one or more stand-alone applications, as one or more modules of an application, as one or more plug-ins, as one or more library functions or functions that may be called by other applications, and/or as a cloud-computing model. Thus, the components 802-814 of the meta-adaptive filter system 800 may be implemented as a stand-alone application, such as a desktop or mobile application. Furthermore, the components 802-814 of the meta-adaptive filter system 800 may be implemented as one or more web-based applications hosted on a remote server. Alternatively, or additionally, the components of the meta-adaptive filter system 800 may be implemented in a suit of mobile device applications or "apps."

Figure 9:
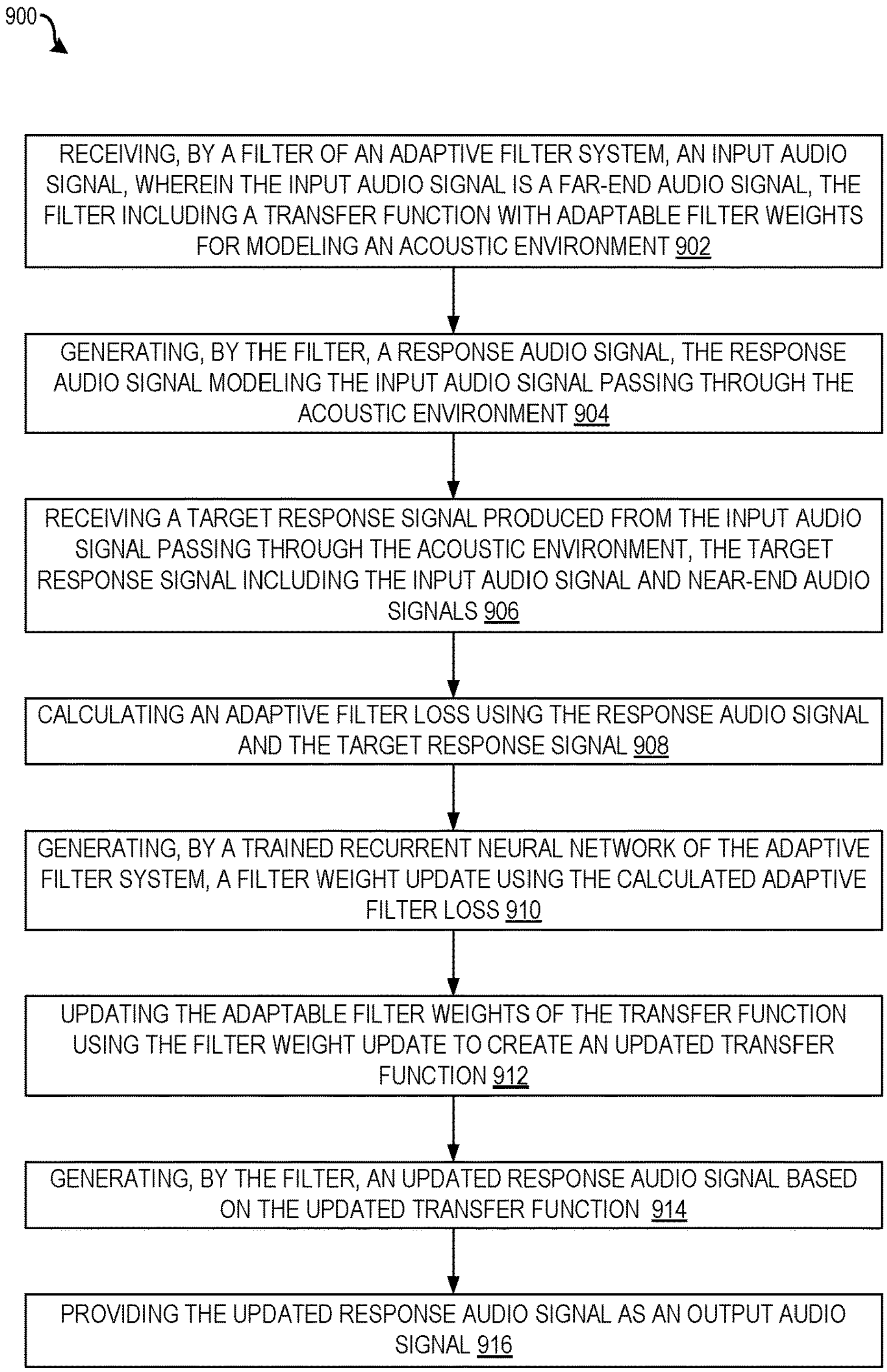
FIG. 9 illustrates a flowchart of a series of acts in a method of generating adaptive filter weights to perform acoustic echo cancellation using a trained neural network in accordance with one or more embodiments.
Figure 10:
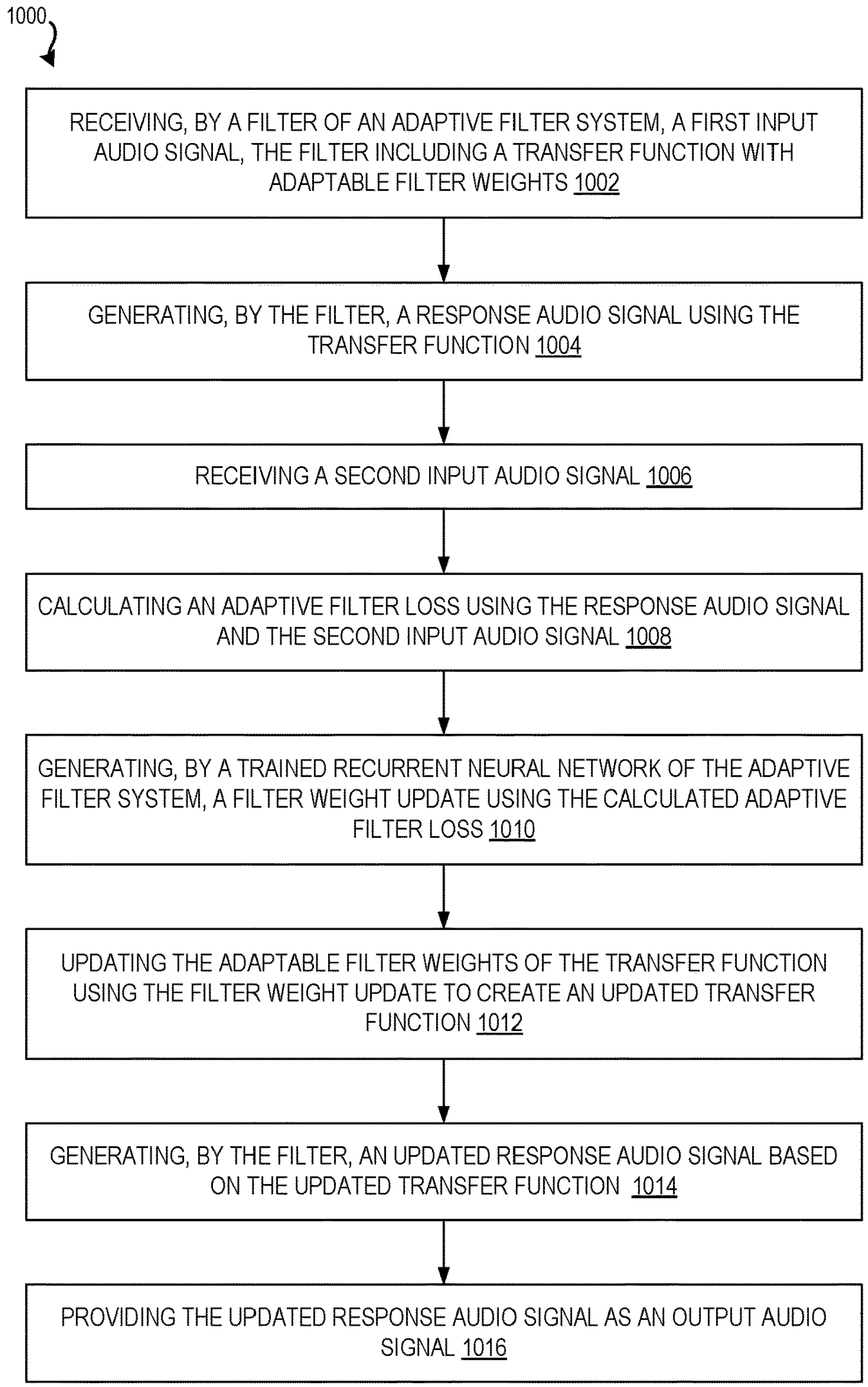
FIG. 10 illustrates a flowchart of a series of acts in a method of generating adaptive filter weights to update a filter using a trained neural network in accordance with one or more embodiments.

FIGS. 1-8, the corresponding text, and the examples, provide a number of different systems and devices that allow a meta-adaptive filter system to use a trained neural network to generate updates for adaptable filter weights for a transfer function of a filter. In addition to the foregoing, embodiments can also be described in terms of flowcharts comprising acts and steps in a method for accomplishing a particular result. For example, FIGS. 9 and 10 illustrate flowcharts of exemplary methods in accordance with one or more embodiments. The method described in relation to FIGS. 9 and 10 may be performed with less or more steps/acts or the steps/acts may be performed in differing orders. Additionally, the steps/acts described herein may be repeated or performed in parallel with one another or in parallel with different instances of the same or similar steps/acts.

FIG. 9 illustrates a flowchart of a series of acts in a method of generating adaptive filter weights to perform acoustic echo cancellation using a trained neural network in accordance with one or more embodiments. In one or more embodiments, the method 900 is performed in a digital medium environment that includes the meta-adaptive filter system 800. The method 900 is intended to be illustrative of one or more methods in accordance with the present disclosure and is not intended to limit potential embodiments. Alternative embodiments can include additional, fewer, or different steps than those articulated in FIG. 9.

As shown in FIG. 9, the method 900 includes an act 902 of receiving, by a filter of an adaptive filter system, an input audio signal, wherein the input audio signal is a far-end audio signal, the filter including a transfer function with adaptable filter weights for modeling an acoustic environment through which the input audio signal passes. In one or more embodiments, the filter is part of the meta-adaptive filter that also a learned adaptive filter optimizer that is trained to determine an update rule (e.g., filter weight update) that can be used to update adaptable filters weights of the filter. In one or more embodiments, the input audio signal is a system input passed to the filter via an input manager. Example input audio signals can include audio of a user speaking (e.g., far-end audio) that is received at a receiver (e.g., near-end speakers, headphones, etc.).

As shown in FIG. 9, the method 900 also includes an act 904 of generating, by the filter, a response audio signal, the response audio signal modeling the input audio signal passing through the acoustic environment. As described previously, the filter models the acoustic environment with a linear frequency-domain filter, $h_\theta$, to generate an output (e.g., the response audio signal). To do so, the filter includes a transfer function with adaptable filter weights, where the transfer function can be expressed as $h_{\theta[\tau]}(u[\tau])$, where θ is a filter weight and $u[\tau]$ is the input audio signal. The goal is to optimize the filter such that the response audio signal closely matches the target response signal generated from passing the input audio signal through the acoustic environment, with any echo of the input audio signal excluded or canceled out.

As shown in FIG. 9, the method 900 also includes an act 906 of receiving a target response signal produced from the input audio signal passing through the acoustic environment, the target response signal including the input audio signal and near-end audio signals. In one or more embodiments, the target response signal is an audio signal received at a near-end receiving element (e.g., a microphone) and can include the original input audio signal (e.g., the far-end audio received at a near-end receiver and picked up by the near-end receiving element. Examples of near-end audio can include near-end background noise and near-end speech.

As shown in FIG. 9, the method 900 also includes an act 908 of calculating an adaptive filter loss using the response audio signal and the target response signal. In one or more embodiments, the adaptive filter loss, or optimizee loss, is calculated using the target response signal and the response audio signal generated by the filter. In one or more embodiments, the adaptive filter loss is the mean squared error (MSE) between the target response, $d[\tau]$, and the estimated response, $h_{\theta[\tau]}(u[\tau])$. The adaptive filter loss can be represented by: $\mathcal{L}(d[\tau], h_{\theta[\tau]}(u[\tau]))$ As shown in FIG. 9, the method 900 also includes an act 910 of generating, by a trained recurrent neural network of the adaptive filter system, a filter weight update using the calculated adaptive filter loss. The parameters of the trained recurrent neural network are optimized using the received input to generate the filter weight updates for the filter. The trained recurrent neural network is an online optimizer trained to optimize the filter by determining filter weight updates based on the adaptive filter loss.

In one or more alternative embodiments, the learned adaptive filter optimizer receives an input that includes an aggregation of a gradient signal of the calculated adaptive filter loss and one or more other inputs received by the meta-adaptive filter system. The one or more other inputs can used to determine the filter weight updates for the filter can include the input audio signal, the target response signal, a response audio signal, and an error signal.

In one or more embodiments, the learned adaptive filter optimizer is a recurrent neural network trained to generate filter weight updates for the filter. In some embodiments, the gradient signal of the calculated adaptive filter loss is a single gradient (e.g., for an independent point in time). In other embodiments, the gradient signal of the calculated adaptive filter loss is a vector of gradients (e.g., for a buffer period of time).

As shown in FIG. 9, the method 900 also includes an act 912 of updating the adaptable filter weights of the transfer function using the filter weight update to create an updated transfer function. The weight, $\theta$, of the filter can then be updated via an additive update rule of the form:

$$\theta[\tau+1]=\theta[\tau]+g_{\phi}(\cdot)$$

where $\theta[\tau]$ are the filter parameters at time $\tau$ and $g_{\phi}(\cdot)$ is the update received from the trained recurrent neural network.

Once updated, the updated transfer function represents an updated model of the acoustic environment. In one or more embodiments, the adaptable filter weights of the transfer function can be continuously updated in response to a change in the acoustic environment (e.g., movement of a speaker and/or microphone in the acoustic environment, etc.). In some embodiments, the adaptable filter weights of the transfer function are updated regularly to adapt the filter to both any changes in the acoustic environment and/or any changes to the system input.

As shown in FIG. 9, the method 900 also includes an act 914 of generating, by the filter, an updated response audio signal based on the updated transfer function. In one or more embodiments, the updated response audio signal generated using the updated transfer function is an audio signal received from the near-end with any echo of the system input (e.g., the far-end input signal) removed. The updated response audio signal is generated as described above with respect to act 904.

As shown in FIG. 9, the method 900 also includes an act 916 of providing the updated response audio signal as an output audio signal. In one or more embodiments, the meta-adaptive filter system can send the output audio signal to a far-end receiver (e.g., speaker).

FIG. 10 illustrates a flowchart of a series of acts in a method of generating adaptive filter weights to update a filter using a trained neural network in accordance with one or more embodiments. In one or more embodiments, the method 1000 is performed in a digital medium environment that includes the meta-adaptive filter system 800. The method 1000 is intended to be illustrative of one or more methods in accordance with the present disclosure and is not intended to limit potential embodiments. Alternative embodiments can include additional, fewer, or different steps than those articulated in FIG. 10.

As shown in FIG. 10, the method 1000 includes an act 1002 of receiving, by a filter of an adaptive filter system, a first input audio signal, the filter including a transfer function with adaptable filter weights. In one or more embodiments, the filter is part of the meta-adaptive filter that also a learned adaptive filter optimizer that is trained to determine an update rule (e.g., filter weight update) that can be used to update adaptable filters weights of the filter. In one or more embodiments, the input audio signal is a system input passed to the filter via an input manager. Example input audio signals can include audio of a user speaking (e.g., far-end audio) that is received at a receiver (e.g., near-end speakers, headphones, etc.) for an acoustic echo cancelation or system identification task, an output audio signal from an acoustic environment for an equalization task, a delayed signal for a dereverberation task, or multiple audio signal from multiple microphones for a beamforming task.

As shown in FIG. 10, the method 1000 also includes an act 1004 of generating, by the filter, a response audio signal using the transfer function. As described previously, the filter includes a linear frequency-domain filter, $h_{\theta}$, to generate an output (e.g., the response audio signal). To do so, the filter includes a transfer function with adaptable filter weights, where the transfer function can be expressed as $h_{\theta[\tau]}(u[\tau])$, where $\theta$ is a filter weight and $u[\tau]$ is the input audio signal. The goal is to optimize the filter using the audio signals received and generated by the meta-adaptive filter to produce an output audio signal for a given task (e.g., acoustic echo cancelation, system identification, equalization, dereverberation, beamforming, etc.).

As shown in FIG. 10, the method 1000 also includes an act 1006 of receiving a second input audio signal. In one or more embodiments, the second input audio signal is an audio signal used to generate an adaptive filter loss with the response audio signal generated by the filter. The second audio signal a version of the input audio signal after passing through an acoustic environment for acoustic echo cancellation or system identification tasks, a sub-optimal version of an original audio signal for an equalization task, a vector of multi-channel signals recorded by a plurality of microphones for a dereverberation task, directional data for a beamforming task, etc.

As shown in FIG. 10, the method 1000 also includes an act 1008 of calculating an adaptive filter loss using the response audio signal and the second input audio signal. In one or more embodiments, the adaptive filter loss, or optimizee loss, is calculated using the second input audio signal and the response audio signal generated by the filter. In one or more embodiments, the adaptive filter loss is the mean squared error (MSE) between the second input audio signal, $d[\tau]$, and the response audio signal, $h_{\theta[\tau]}(u[\tau])$. The adaptive filter loss can be represented by:

$$\mathcal{L}(d[\tau], h_{\theta[\tau]}(u[\tau]))$$

As shown in FIG. 10, the method 1000 also includes an act 1010 of generating, by a trained recurrent neural network of the adaptive filter system, a filter weight update using the calculated adaptive filter loss. The parameters of the trained recurrent neural network are optimized using the received input to generate the filter weight updates for the filter. The trained recurrent neural network is an online optimizer trained to optimize the filter by determining filter weight updates based on the adaptive filter loss.

In one or alternative embodiments, the learned adaptive filter optimizer receives an input that includes an aggregation of a gradient signal of the calculated adaptive filter loss and one or more other inputs received by the meta-adaptive filter system. The one or more other inputs can used to determine the filter weight updates for the filter can include the input audio signal, the target response signal, a response audio signal, and an error signal.

In one or more embodiments, the learned adaptive filter optimizer is a recurrent neural network trained to generate filter weight updates for the filter. In some embodiments, the gradient signal of the calculated adaptive filter loss is a single gradient (e.g., for an independent point in time). In other embodiments, the gradient signal of the calculated adaptive filter loss is a vector of gradients (e.g., for a buffer period of time).

As shown in FIG. 10, the method 1000 also includes an act 1012 of updating the adaptable filter weights of the transfer function using the filter weight update to create an updated transfer function. The weight, θ, of the filter can then be updated via an additive update rule of the form:

$$\theta[\tau+1]=\theta[\tau]+g_{\phi}(\cdot)$$

where $\theta[\tau]$ are the filter parameters at time $\tau$ and $g_{\phi}(\cdot)$ is the update received from the trained recurrent neural network.

Once updated, the updated transfer function represents an updated model of the acoustic environment. In one or more embodiments, the adaptable filter weights of the transfer function can be continuously updated in response to a change in the acoustic environment (e.g., movement of a speaker and/or microphone in the acoustic environment, changes in directions of speaker in a multiple microphone setting, etc.). In some embodiments, the adaptable filter weights of the transfer function are updated regularly to adapt the filter to both any changes in the acoustic environment and/or any changes to the system input.

As shown in FIG. 10, the method 1000 also includes an act 1014 of generating, by the filter, an updated response audio signal based on the updated transfer function. The updated response audio signal is generated as described above with respect to act 1004.

As shown in FIG. 10, the method 1000 also includes an act 1016 of providing the updated response audio signal as an output audio signal. In one or more embodiments, the meta-adaptive filter system can send the output audio signal to a receiver (e.g., speaker).

Figure 11:
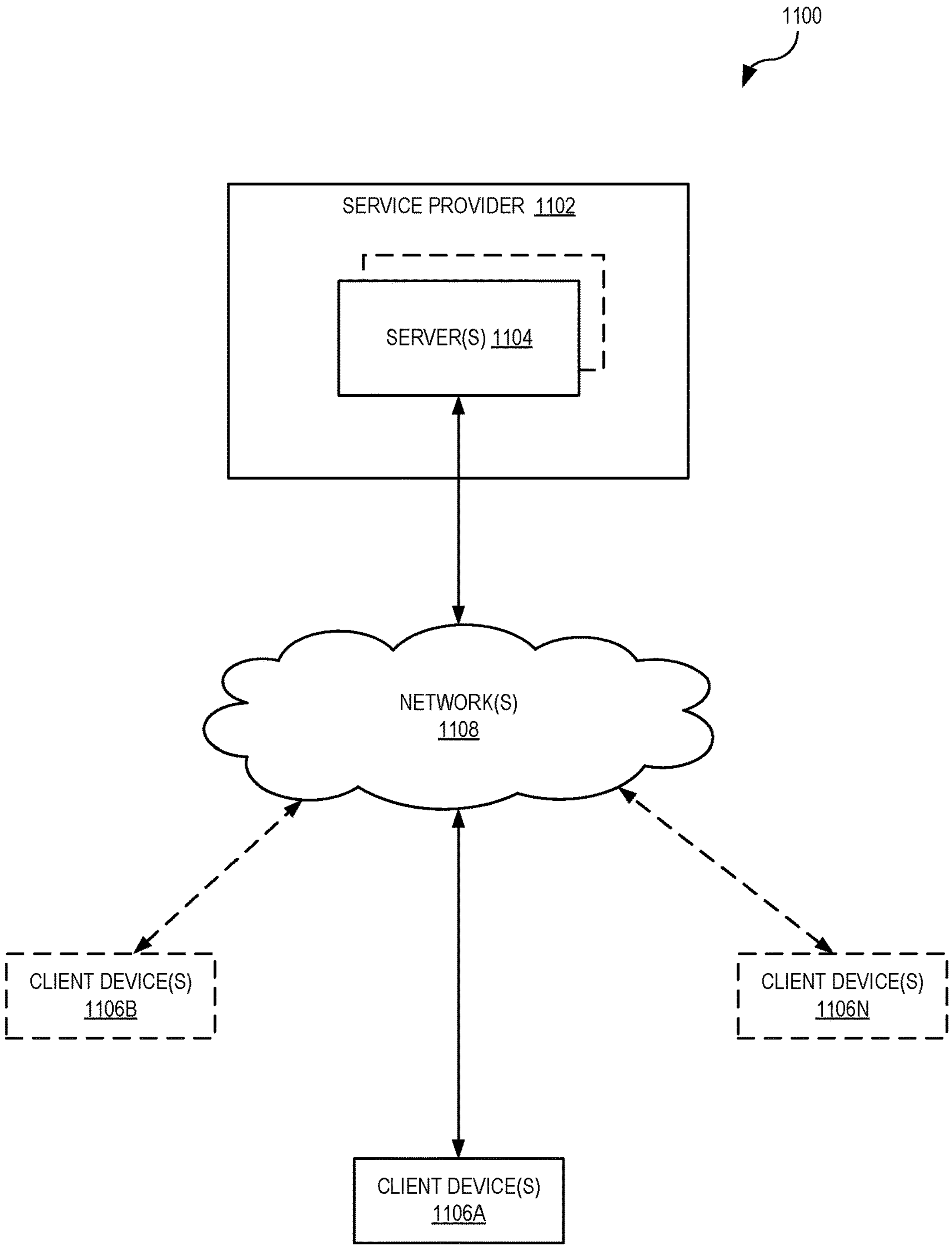
FIG. 11 illustrates a schematic diagram of an exemplary environment in which the meta-adaptive filter system can operate in accordance with one or more embodiments.

FIG. 11 illustrates a schematic diagram of an exemplary environment 1100 in which the media recommendation system 800 can operate in accordance with one or more embodiments. In one or more embodiments, the environment 1100 includes a service provider 1102 which may include one or more servers 1104 connected to a plurality of client devices 1106A-1106N via one or more networks 1108. The client devices 1106A-1106N, the one or more networks 1108, the service provider 1102, and the one or more servers 1104 may communicate with each other or other components using any communication platforms and technologies suitable for transporting data and/or communication signals, including any known communication technologies, devices, media, and protocols supportive of remote data communications, examples of which will be described in more detail below with respect to FIG. 12.

Although FIG. 11 illustrates a particular arrangement of the client devices 1106A-1106N, the one or more networks 1108, the service provider 1102, and the one or more servers 1104, various additional arrangements are possible. For example, the client devices 1106A-1106N may directly communicate with the one or more servers 1104, bypassing the network 1108. Or alternatively, the client devices 1106A-1106N may directly communicate with each other. The service provider 1102 may be a public cloud service provider which owns and operates their own infrastructure in one or more data centers and provides this infrastructure to customers and end users on demand to host applications on the one or more servers 1104. The servers may include one or more hardware servers (e.g., hosts), each with its own computing resources (e.g., processors, memory, disk space, networking bandwidth, etc.) which may be securely divided between multiple customers, each of which may host their own applications on the one or more servers 1104. In some embodiments, the service provider may be a private cloud provider which maintains cloud infrastructure for a single organization. The one or more servers 1104 may similarly include one or more hardware servers, each with its own computing resources, which are divided among applications hosted by the one or more servers for use by members of the organization or their customers.

Similarly, although the environment 1100 of FIG. 11 is depicted as having various components, the environment 1100 may have additional or alternative components. For example, the environment 1100 can be implemented on a single computing device with the media recommendation system 800. In particular, the media recommendation system 800 may be implemented in whole or in part on the client device 1106A. Alternatively, in some embodiments, the environment 1100 is implemented in a distributed architecture across multiple computing devices.

As illustrated in FIG. 11, the environment 1100 may include client devices 1106A-1106N. The client devices 1106A-1106N may comprise any computing device. For example, client devices 1106A-1106N may comprise one or more personal computers, laptop computers, mobile devices, mobile phones, tablets, special purpose computers, TVs, or other computing devices, including computing devices described below with regard to FIG. 12. Although three client devices are shown in FIG. 11, it will be appreciated that client devices 1106A-1106N may comprise any number of client devices (greater or smaller than shown).

Moreover, as illustrated in FIG. 11, the client devices 1106A-1106N and the one or more servers 1104 may communicate via one or more networks 1108. The one or more networks 1108 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1108 may be any suitable network over which the client devices 1106A-1106N may access the service provider 1102 and server 1104, or vice versa. The one or more networks 1108 will be discussed in more detail below with regard to FIG. 12.

In addition, the environment 1100 may also include one or more servers 1104. The one or more servers 1104 may generate, store, receive, and transmit any type of data, including input data 822 and training data 824, or other information. For example, a server 1104 may receive data from a client device, such as the client device 1106A, and send the data to another client device, such as the client device 1106B and/or 1106N. The server 1104 can also transmit electronic messages between one or more users of the environment 1100. In one example embodiment, the server 1104 is a data server. The server 1104 can also comprise a communication server or a web-hosting server. Additional details regarding the server 1104 will be discussed below with respect to FIG. 12.

As mentioned, in one or more embodiments, the one or more servers 1104 can include or implement at least a portion of the media recommendation system 800. In particular, the media recommendation system 800 can comprise an application running on the one or more servers 1104 or a portion of the media recommendation system 800 can be downloaded from the one or more servers 1104. For example, the media recommendation system 800 can include a web hosting application that allows the client devices 1106A-1106N to interact with content hosted at the one or more servers 1104. To illustrate, in one or more embodiments of the environment 1100, one or more client devices 1106A-1106N can access a webpage supported by the one or more servers 1104. In particular, the client device 1106A can run a web application (e.g., a web browser) to allow a user to access, view, and/or interact with a webpage or website hosted at the one or more servers 1104.

Upon the client device 1106A accessing a webpage or other web application hosted at the one or more servers 1104, in one or more embodiments, the one or more servers 1104 can provide a user of the client device 1106A with an interface to provide inputs, including an audio signal. Upon receiving the audio signal, the one or more servers 1104 can automatically perform the methods and processes described above to adapt a filter of a meta-adaptive filter using a learned adaptive filter optimizer.

As just described, the media recommendation system 800 may be implemented in whole, or in part, by the individual elements 1102-1108 of the environment 1100. It will be appreciated that although certain components of the media recommendation system 800 are described in the previous examples with regard to particular elements of the environment 1100, various alternative implementations are possible. For instance, in one or more embodiments, the media recommendation system 800 is implemented on any of the client devices 1106A-1106N. Similarly, in one or more embodiments, the media recommendation system 800 may be implemented on the one or more servers 1104. Moreover, different components and functions of the media recommendation system 800 may be implemented separately among client devices 1106A-1106N, the one or more servers 1104, and the network 1108.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
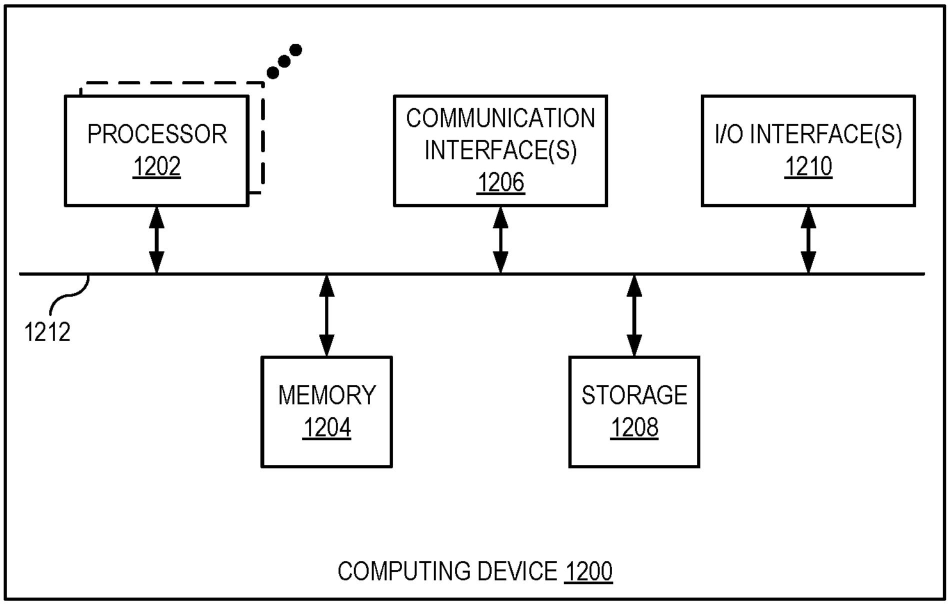
FIG. 12 illustrates a block diagram of an exemplary computing device in accordance with one or more embodiments.

FIG. 12 illustrates, in block diagram form, an exemplary computing device 1200 that may be configured to perform one or more of the processes described above. One will appreciate that one or more computing devices such as the computing device 1200 may implement the media recommendation system 800. As shown by FIG. 12, the computing device can comprise a processor 1202, memory 1204, one or more communication interfaces 1206, a storage device 1208, and one or more input or output ("I/O") devices/interfaces 1210. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1208 and decode and execute them. In various embodiments, the processor(s) 1202 may include one or more central processing units (CPUs), graphics processing units (GPUs), field programmable gate arrays (FPGAs), systems on chip (SoC), or other processor(s) or combinations of processors.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1204 may be internal or distributed memory.

The computing device 1200 can further include one or more communication interfaces 1206. A communication interface 1206 can include hardware, software, or both. The communication interface 1206 can provide one or more interfaces for communication (such as, for example, packet-based communication) between the computing device and one or more other computing devices 1200 or one or more networks. As an example, and not by way of limitation, communication interface 1206 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

The computing device 1200 includes a storage device 1208 includes storage for storing data or instructions. As an example, and not by way of limitation, storage device 1208 can comprise a non-transitory storage medium described above. The storage device 1208 may include a hard disk drive (HDD), flash memory, a Universal Serial Bus (USB) drive or a combination these or other storage devices. The computing device 1200 also includes one or more I/O devices/interfaces 1210, which are provided to allow a user to provide input to (such as user strokes), receive output from, and otherwise transfer data to and from the computing device 1200. These I/O devices/interfaces 1210 may include a mouse, keypad or a keyboard, a touch screen, camera, optical scanner, network interface, modem, other known I/O devices or a combination of such I/O devices/interfaces 1210. The touch screen may be activated with a stylus or a finger.

The I/O devices/interfaces 1210 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1210 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method comprising:

receiving, by a filter of an adaptive filter system, an input audio signal, wherein the input audio signal is a far-end audio signal, the filter including a transfer function with adaptable filter weights for modeling an acoustic environment;

generating, by the filter, a response audio signal, the response audio signal modeling the input audio signal passing through the acoustic environment;

receiving a target response signal produced from the input audio signal passing through the acoustic environment, the target response signal including the input audio signal and near-end audio signals;

calculating an adaptive filter loss using the response audio signal and the target response signal;

generating, by a trained recurrent neural network of the adaptive filter system, a filter weight update using the calculated adaptive filter loss;

updating the adaptable filter weights of the transfer function using the filter weight update to create an updated transfer function;

generating, by the filter, an updated response audio signal based on the updated transfer function; and providing the updated response audio signal as an output audio signal.

2. The computer-implemented method of claim 1, wherein the near-end audio signals including one or more of near-end background noise and near-end speech.

3. The computer-implemented method of claim 1, wherein the adaptive filter loss is a mean squared error between the response audio signal and the target response signal.

4. The computer-implemented method of claim 1, wherein generating the filter weight update using the calculated adaptive filter loss further comprises:

receiving, by the trained recurrent neural network, an input, the input including a gradient signal of the calculated adaptive filter loss;

optimizing parameters of the trained recurrent neural network using the received input;

generating the filter weight update using the trained recurrent neural network with the optimized parameters; and providing the filter weight update to the filter, wherein the filter is a short-time Fourier transform filter.

5. The computer-implemented method of claim 4, wherein the gradient signal of the calculated adaptive filter loss is a vector of gradient signals corresponding to a buffer period of time.

6. The computer-implemented method of claim 1, wherein the updated transfer function represents an updated model of the acoustic environment.

7. The computer-implemented method of claim 1, wherein the adaptive filter system performs acoustic echo cancellation.

8. The computer-implemented method of claim 1, wherein updating the adaptable filter weights of the transfer function is in response to a change in the acoustic environment.

9. A non-transitory computer-readable storage medium storing executable instructions, which when executed by a processing device, cause the processing device to perform operations comprising:

receiving, by a filter of an adaptive filter system, an input audio signal, wherein the input audio signal is a far-end audio signal, the filter including a transfer function with adaptable filter weights for modeling an acoustic environment;

generating, by the filter, a response audio signal, the response audio signal modeling the input audio signal passing through the acoustic environment;

receiving a target response signal produced from the input audio signal passing through the acoustic environment, the target response signal including the input audio signal and near-end audio signals;

calculating an adaptive filter loss using the response audio signal and the target response signal;

generating, by a trained recurrent neural network of the adaptive filter system, a filter weight update using the calculated adaptive filter loss;

updating the adaptable filter weights of the transfer function using the filter weight update to create an updated transfer function;

generating, by the filter, an updated response audio signal based on the updated transfer function; and providing the updated response audio signal as an output audio signal.

10. The non-transitory computer-readable storage medium of claim 9, wherein the near-end audio signals including one or more of near-end background noise and near-end speech.

11. The non-transitory computer-readable storage medium of claim 9, wherein the adaptive filter loss is a mean squared error between the response audio signal and the target response signal.

12. The non-transitory computer-readable storage medium of claim 9, wherein to generate the filter weight update using the calculated adaptive filter loss the instructions further cause the processing device to perform operations comprising:

receiving, by the trained recurrent neural network, an input, the input including a gradient signal of the calculated adaptive filter loss;

optimizing parameters of the trained recurrent neural network using the received input;

generating the filter weight update using the trained recurrent neural network with the optimized parameters; and providing the filter weight update to the filter, wherein the filter is a short-time Fourier transform filter.

13. The non-transitory computer-readable storage medium of claim 12, wherein the gradient signal of the calculated adaptive filter loss is a vector of gradient signals corresponding to a buffer period of time.

14. The non-transitory computer-readable storage medium of claim 9, wherein the updated transfer function represents an updated model of the acoustic environment.

15. The non-transitory computer-readable storage medium of claim 9, wherein the adaptive filter system performs acoustic echo cancellation.

16. The non-transitory computer-readable storage medium of claim 9, wherein updating the adaptable filter weights of the transfer function is in response to a change in the acoustic environment.

17. A computer-implemented method comprising:

receiving, by a filter of an adaptive filter system, a first input audio signal, the filter including a transfer function with adaptable filter weights;

generating, by the filter, a response audio signal using the transfer function;

receiving a second input audio signal;

calculating an adaptive filter loss using the response audio signal and the second input audio signal;

generating, by a trained recurrent neural network of the adaptive filter system, a filter weight update using the calculated adaptive filter loss;

updating the adaptable filter weights of the transfer function using the filter weight update to create an updated transfer function;

generating, by the filter, an updated response audio signal based on the updated transfer function; and providing the updated response audio signal as an output audio signal.

18. The computer-implemented method of claim 17, wherein the adaptive filter loss is a mean squared error between the response audio signal and the second input audio signal.

19. The computer-implemented method of claim 17, wherein generating the filter weight update using the calculated adaptive filter loss further comprises:

receiving, by the trained recurrent neural network, an input, the input including a gradient signal of the calculated adaptive filter loss;

optimizing parameters of the trained recurrent neural network using the received input;

generating the filter weight update using the trained recurrent neural network with the optimized parameters; and providing the filter weight update to the filter, wherein the filter is a short-time Fourier transform filter.

20. The computer-implemented method of claim 19, wherein the gradient signal of the calculated adaptive filter loss is a vector of gradient signals corresponding to a buffer period of time.

* * * * *